(12) United States Patent
Liu et al.

(10) Patent No.: US 12,132,401 B2
(45) Date of Patent: Oct. 29, 2024

(54) BUCK CONVERTER AND CONTROL METHOD

(71) Applicant: Halo Microelectronics International, Campbell, CA (US)

(72) Inventors: Rui Liu, Fremont, CA (US); Sofjan Goenawan, Cupertino, CA (US)

(73) Assignee: Halo Microelectronics International, Campbell, CA (US)

( * ) Notice: Subject to any disclaimer, the term of this patent is extended or adjusted under 35 U.S.C. 154(b) by 231 days.

(21) Appl. No.: 18/056,758

(22) Filed: Nov. 18, 2022

(65) Prior Publication Data

US 2023/0299674 A1 Sep. 21, 2023

Related U.S. Application Data

(60) Provisional application No. 63/268,112, filed on Feb. 16, 2022.

(51) Int. Cl.
| | |
|---|---|
| *H02M 3/158* | (2006.01) |
| *H02M 1/08* | (2006.01) |
| *H02M 3/06* | (2006.01) |
| *H02M 3/156* | (2006.01) |
| *H02M 3/157* | (2006.01) |

(52) U.S. Cl.
CPC .......... *H02M 3/158* (2013.01); *H02M 1/083* (2013.01); *H02M 3/06* (2013.01); *H02M 3/156* (2013.01); *H02M 3/157* (2013.01)

(58) Field of Classification Search
CPC ...... H02M 1/083; H02M 3/06; H02M 1/0009; H02M 1/0025; Y02B 70/10
See application file for complete search history.

(56) References Cited

U.S. PATENT DOCUMENTS

| | | | | |
|---|---|---|---|---|
| 8,593,125 B1 * | 11/2013 | Xue | ...................... | H02M 3/156 |
| | | | | 323/283 |
| 9,653,992 B2 * | 5/2017 | Yuan | ...................... | H02M 3/156 |
| 9,667,146 B1 * | 5/2017 | Goenawan | ............ | H02M 3/156 |
| 10,432,091 B2 * | 10/2019 | Chen | ...................... | H02M 3/158 |
| 10,498,237 B1 * | 12/2019 | Lin | ...................... | H02M 3/158 |
| 10,797,598 B1 * | 10/2020 | Malla | ...................... | H02M 3/158 |
| 10,944,322 B1 * | 3/2021 | Volk | ...................... | H02M 3/158 |
| 11,121,626 B2 * | 9/2021 | Xi | .......................... | H02M 3/158 |
| 11,394,299 B2 * | 7/2022 | Lazaro | ................ | H02M 1/0061 |
| 2004/0212356 A1 * | 10/2004 | Dowlatabadi | ......... | H02M 3/156 |
| | | | | 323/282 |

(Continued)

*Primary Examiner* — Yusef A Ahmed
(74) *Attorney, Agent, or Firm* — AP3 Law Firm PLLC

(57) ABSTRACT

An apparatus includes a PWM ramp generator coupled between a switching node of a power converter and a first input of a comparator, the PWM ramp generator including a first resistor and a first capacitor connected in series between the switching node and the first input of the comparator, and a second resistor and a second capacitor connected in parallel between the first input of the comparator and a feedback node, and a PFM control circuit including an error amplifier and a current zero crossing detection comparator, wherein the error amplifier is coupled between a second input of the comparator and a reference node, and the PFM control circuit is configured to generate gate drive signal for the power converter when the power converter is configured to operate in a PFM mode.

16 Claims, 14 Drawing Sheets

(56) References Cited

U.S. PATENT DOCUMENTS

| | | | |
|---|---|---|---|
| 2005/0057238 A1* | 3/2005 | Yoshida | H02M 3/156 323/282 |
| 2006/0125454 A1* | 6/2006 | Chen | H02M 3/1588 323/282 |
| 2010/0225293 A1* | 9/2010 | Wang | H02M 3/33507 323/290 |
| 2010/0320983 A1* | 12/2010 | Wu | H02M 3/156 323/283 |
| 2011/0006744 A1* | 1/2011 | Dearborn | H02M 3/1582 323/282 |
| 2011/0062926 A1* | 3/2011 | Qiu | H02M 3/1588 323/282 |
| 2011/0241641 A1* | 10/2011 | Chen | H02M 3/1588 323/284 |
| 2011/0267018 A1 | 11/2011 | Tao | |
| 2012/0229110 A1* | 9/2012 | Huang | H02M 3/1582 323/282 |
| 2013/0294118 A1* | 11/2013 | So | H02M 3/33507 363/21.16 |
| 2014/0292299 A1* | 10/2014 | Yang | H02M 3/1588 323/288 |
| 2015/0091544 A1* | 4/2015 | Jayaraj | H02M 3/156 323/284 |
| 2015/0244276 A1* | 8/2015 | Li | H03K 21/08 363/21.17 |
| 2016/0301307 A1* | 10/2016 | Huang | H02M 3/158 |
| 2018/0123460 A1* | 5/2018 | Chen | H02M 1/08 |
| 2018/0175725 A1* | 6/2018 | Hu | H02M 3/156 |
| 2018/0337599 A1* | 11/2018 | Chen | H02M 3/158 |
| 2018/0375429 A1* | 12/2018 | Trichy | H02M 3/158 |
| 2019/0013733 A1* | 1/2019 | Trichy | H02M 1/088 |
| 2019/0305666 A1* | 10/2019 | Yang | H02M 1/0009 |
| 2020/0021188 A1* | 1/2020 | Xi | H02M 3/156 |
| 2020/0127566 A1* | 4/2020 | Lazaro | H02M 1/0061 |
| 2020/0144901 A1* | 5/2020 | Bi | H02M 3/1588 |
| 2020/0161977 A1* | 5/2020 | Yang | H02M 3/157 |
| 2021/0099073 A1* | 4/2021 | Hrinya | H02M 3/1588 |
| 2021/0152088 A1* | 5/2021 | Volk | H02M 1/08 |
| 2021/0242774 A1* | 8/2021 | Yun | H02M 1/0032 |
| 2021/0305899 A1* | 9/2021 | Hsieh | H02M 1/0035 |
| 2022/0045608 A1* | 2/2022 | Bertolini | H02M 3/1588 |
| 2022/0407421 A1* | 12/2022 | Kawano | H02M 3/158 |
| 2023/0009867 A1* | 1/2023 | Volk | H02M 3/158 |
| 2023/0133452 A1* | 5/2023 | Sareen | H03K 5/24 323/272 |
| 2023/0261575 A1* | 8/2023 | Biziitu | H02M 3/158 323/271 |
| 2023/0396141 A1* | 12/2023 | Abesingha | H02M 3/158 |
| 2024/0072660 A1* | 2/2024 | Wu | H02M 3/1566 |
| 2024/0106331 A1* | 3/2024 | Miyanaga | H02M 3/158 |
| 2024/0213967 A1* | 6/2024 | Moore | H02M 1/0025 |

\* cited by examiner

BUCK CONVERTER AND CONTROL METHOD

PRIORITY

This application claims the benefit of U.S. Provisional Application No. 63/268,112, filed on Feb. 16, 2022, entitled "Buck Converter and Control Method," which application is hereby incorporated herein by reference.

TECHNICAL FIELD

The present invention is directed, in general, to a Direct Current-to-Direct Current (DC/DC) power conversion system and more specifically, to a buck DC/DC converter (also known as a step-down DC/DC converter) that provides the fastest output load transient response and enables end-users to set a desired output voltage using an output feedback resistor divider. Such a buck DC/DC converter allows end-users to design a power supply for different applications using a single integrated circuit (IC) device.

BACKGROUND

Modern developments in mobile devices (e.g., smartphones), tablets, notebooks, and data centers require DC/DC converters having the fastest line and load transient responses. On the other hand, each DC/DC converter is designed to be suitable for many different system applications so as to simplify logistic processes.

A variety of control schemes have been applied to buck converters. Among all control schemes applied to the buck converters, the hysteresis control scheme has been widely adopted because of its fastest output transient responses under either a line or an output load transient event. However, to achieve the fastest output transient responses, the output voltage must be fed back to the hysteresis comparator directly, resulting in a limited output voltage range in which the hysteresis control buck converter is able to operate. This is because in many cases the output ripple voltage is used as the ramp voltage required by the hysteresis comparator.

In some hysteresis control schemes, the ramp voltage can be generated by an artificial network. As a result, the ramp voltage is independent of the output ripple voltage. However, in order to achieve superior output transient responses, the output is connected to the input of the hysteresis comparator through an output feedback divider. The output feedback divider is designed so that the output voltage can be regulated at different values. One drawback of having this output feedback divider is the attenuation introduced by the output feedback divider reduces the output voltage deviation at the feedback input during an output transient event. The reduced voltage deviation consequently results in slower line and load transient responses. As a result of having slower line and load transient responses, more capacitors are needed to hold the output transient responses within specification limits, resulting in more expensive and larger printed circuit board (PCB) area solutions. To solve this issue, a hysteresis control method is proposed as shown in FIG. 1.

FIG. 1 illustrates a schematic diagram of a power converter. The power converter 100 is a buck converter comprising an input filter capacitor 101, a high-side switch 102, a low-side switch 103, an output inductor 104 and an output filtering capacitor 105. The hysteresis controller of the power converter 100 comprises a resistor 111, a capacitor 108, a hysteresis comparator 112 and a driving circuit block 113. The hysteresis controller of the power converter 100 further comprises an output feedback divider comprising resistors 106, 107, 109 and a capacitor 110. The REF voltage shown in FIG. 1 is a constant reference voltage. The output voltage (VOUT) of the power converter 100 can be expressed by the following equation:

$$VOUT = (1 + R106/R107) \times REF \quad (1)$$

In Equation (1), R106 is the resistance value of the resistor 106. R107 is the resistance value of the resistor 107.

The slow output transient response issue is resolved by adding the capacitor 110. In operation, the capacitor 110 functions as a feedforward capacitor to pass the output voltage deviation directly to the inverting input of the hysteresis comparator 112 without any attenuation. In addition, the capacitor 110 also withstands the DC voltage difference between the output VOUT and the feedback node FB. The resistor 109 provides a DC path for the leakage current flowing out of the inverting input of the comparator 112. Furthermore, the resistor 109 and the capacitors 108 and 110 form a high pass filter. This high pass filter is designed such that the majority of the output voltage deviation during an output transient event reaches the inverting input of the hysteresis comparator 112.

The hysteresis control method shown in FIG. 1 has three drawbacks. First, the capacitance of the capacitor 110 must be larger than that of the capacitor 108 to avoid a capacitor divider effect when the output voltage deviation is fed into the comparator 112 during an output load transient event. Larger capacitance means more silicon area, extra power consumption and complexity. Second, both VOUT and FB inputs are required in the hysteresis control method shown in FIG. 1. This control system configuration is not compatible with the most popular control scheme (e.g., voltage mode control, current mode control and constant-on time control) in which the FB input is the only required input. Third, the voltage drop across the inductor DC resistance (DCR) of the output inductor due to the output load current presents at the capacitor 108. This means that during an output load transient response, the average voltage of the capacitor 108 varies depending on different output load currents. The variation of the voltage across the capacitor 108 has an impact on the voltage at the inverting input of the hysteresis comparator 112. Such a voltage variation at the inverting input of the hysteresis comparator 112 can affect the output transient response of the power converter 100.

Accordingly, what needed in the art is a control apparatus that has only the FB input to set the output voltage at different values for different applications such as Pulse Width Modulation (PWM) applications, Pulse Frequency Modulation (PFM) applications and the like. Meanwhile, the control apparatus is able to achieve the same or similar output transient responses as discussed above with respect to FIG. 1.

SUMMARY

These and other problems are generally solved or circumvented, and technical advantages are generally achieved, by preferred embodiments of the present disclosure which provide a hysteresis control apparatus and method for a buck converter.

In accordance with an embodiment, an apparatus comprises a PWM ramp generator coupled between a switching node of a power converter and a first input of a comparator, the PWM ramp generator comprising a first resistor and a first capacitor connected in series between the switching node and the first input of the comparator, and a second resistor and a second capacitor connected in parallel between the first input of the comparator and a feedback node, and a PFM control circuit comprising an error amplifier and a current zero crossing detection comparator, wherein the error amplifier is coupled between a second input of the comparator and a reference node, and the PFM control circuit is configured to generate gate drive signal for the power converter when the power converter is configured to operate in a PFM mode.

In accordance with another embodiment, a method comprises in a PWM mode of a power converter, configuring a plurality of control switches such that gate drive signals of the power converter are generated based on a comparison between an output of a PWM ramp generator and a predetermined reference, and in a PFM mode of the power converter, configuring the plurality of control switches such that gate drive signals of the power converter are generated based on signals generated by an error amplifier and a current zero crossing detection comparator.

In accordance with yet another embodiment, a system comprises a high-side switch and a low-side switch connected in series between an input voltage bus and ground, wherein a common node of the high-side switch and the low-side switch is a switching node, an inductor connected between the common node of the high-side switch and the low-side switch and an output of the system, a PWM ramp generator coupled between the switching node and a first input of a comparator, the PWM ramp generator comprising a first resistor and a first capacitor connected in series between the switching node and the first input of the comparator, and a second resistor and a second capacitor connected in parallel between the first input of the comparator and a feedback node, and a PFM control circuit comprising an error amplifier and a current zero crossing detection comparator, wherein the error amplifier is coupled between a second input of the comparator and a reference node, and the PFM control circuit is configured to generate gate drive signal for the system when the system is configured to operate in a PFM mode.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a hysteresis control apparatus and method for a buck converter. The invention may also be applied, however, to a variety of power conversion systems. Hereinafter, various embodiments will be explained in detail with reference to the accompanying drawings.

Figure 2:
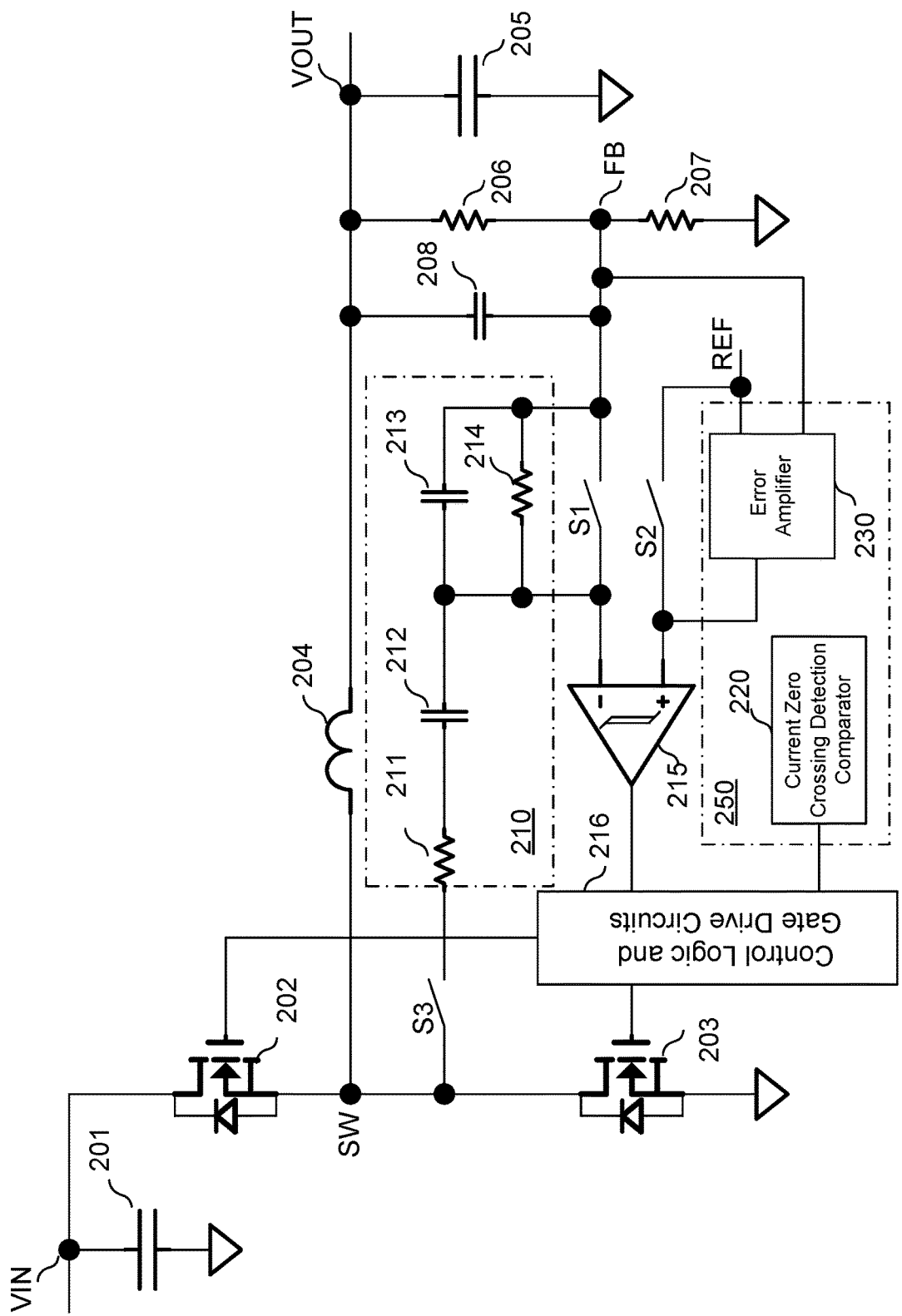
FIG. 2 illustrates a power converter and the associated PWM and PFM control circuits in accordance with various embodiments of the present disclosure.

FIG. 2 illustrates a power converter and the associated PWM and PFM control circuits in accordance with various embodiments of the present disclosure. The power converter is a buck converter comprising an input filter capacitor 201, a high-side switch 202, a low-side switch 203, an output inductor 204 and an output filtering capacitor 205. As shown in FIG. 2, the high-side switch 202 and the low-side switch 203 are connected in series between an input voltage bus and ground. A common node of the high-side switch 202 and the low-side switch 203 is the switching node (SW as shown in FIG. 2) of the power converter. The output inductor 204 is connected between the common node of the high-side switch 202 and the low-side switch 203, and an output of the power converter.

The control circuit of the power converter shown in FIG. 2 comprises a PWM ramp generator 210, a PFM control circuit 250, a comparator 215, a feedback divider, and control logic and gate drive circuits 216.

In some embodiments, the comparator 215 is implemented as a hysteresis comparator. The comparator 215 is configured to generate a control signal fed into the control logic and gate drive circuits 216.

As shown in FIG. 2, the feedback divider is formed by resistors 206 and 207. A common node of the resistors 206 and 207 is the feedback node of the power converter. In order to achieve a better transient response, a capacitor 208 is connected in parallel with the resistor 206. The capacitor 208 functions as a feedforward capacitor.

As shown in FIG. 2, the PWM ramp generator 210 is coupled between the switching node SW of the power converter and a first input of the comparator 215. More particularly, the PWM ramp generator 210 is connected to the switching node SW through a third control switch S3. The PWM ramp generator 210 comprises a first resistor 211 and a first capacitor 212 connected in series between the third control switch S3 and the first input of the comparator 215. The first input is an inverting input of the comparator 215. The PWM ramp generator 210 further comprises a second resistor 214 and a second capacitor 213 connected in parallel between the first input of the comparator 215 and the feedback node FB.

As shown in FIG. 2, the PFM control circuit 250 comprises an error amplifier 230 and a current zero crossing detection comparator 220. The error amplifier 230 is coupled between a second input of the comparator 215 and a reference node REF. The second input is a non-inverting input of the comparator 215. The PFM control circuit 250 is configured to generate gate drive signal for the power converter when the power converter is configured to operate in a PFM mode.

It should be noted that the block diagram of the PFM control circuit 250 shown in FIG. 2 merely includes basic function units of the PFM control circuit 250. Depending on different PFM control schemes, the structure of the PFM control circuit 250 may vary accordingly. In some embodiments, a threshold voltage generator may be coupled between the non-inverting input of the comparator 215 and the error amplifier 230. The detailed implementation of this PFM control scheme will be described below with respect to FIGS. 8-9. In alternative embodiments, a peak current detection comparator may be employed to determine the on-time of the high-side switch 202. The detailed implementation of this PFM control scheme will be described below with respect to FIGS. 10-11. In alternative embodiments, a constant on-time generator may be employed to determine the on-time of the high-side switch. The detailed implementation of this PFM control scheme will be described below with respect to FIGS. 12-13.

Three control switches are employed to change the control circuit configuration depending on different operating modes. As shown in FIG. 2, a first control switch S1 is connected between the first input of the comparator 215 and the feedback node FB. A second control switch S2 is connected between the second input of the comparator 215 and the reference node REF. The third control switch S3 is connected between the switching node SW and the first resistor 211. In operation, the second switch S2 and the third switch S3 are configured to be turned on, and the first switch S1 is configured to be turned off when the power converter is configured to operate in a PWM mode. On the other hand, the second switch S2 and the third switch S3 are configured to be turned off, and the first switch S1 is configured to be turned on when the power converter is configured to operate in the PFM mode. It should be noted that depending on design needs, the third switch S3 can be placed any location between the switching node SW and the first input of the comparator 215. In other words, the third switch S3 is coupled between the switching node SW and the first input of the comparator 215. It should further be noted that depending on design needs, the locations of the first resistor 211 and the first capacitor 212 can be swapped.

In some embodiments, a resistor-capacitor filter (not shown) may be connected to the switching node SW. In operation, the resistor-capacitor filter is configured such that an output voltage of the resistor-capacitor filter is used to determine an output voltage of the power converter when the power converter is configured to operate in the PFM mode during an initial power up period. Vo can be used, together with the input voltage, to determine the output value of the constant-on-time generator used in the constant-on time PFM control.

In some embodiments, the PWM ramp generator 210, three control switches S1-S3, the comparator 215, the PFM control circuit 250 and the control logic and gate drive circuits 216 may be integrated into a single IC device or on a printed circuit board. In alternative embodiments, the power switches 202 and 203 may be integrated into this single IC device too.

In the PWM mode operation, the PWM ramp generator 210 generates a saw-tooth like ramp voltage on top of the voltage on the FB node. The sum of the saw-tooth like ramp voltage and the voltage on the FB node is compared with the REF voltage to control the on and off time intervals of the power switches 202 and 203, thereby regulating the output voltage of the power converter within the specification limits.

In the PWM mode operation, only the ramp voltage across the capacitor 213 is used to determine the on and off time intervals of the power switches 202 and 203. The capacitor 208 is introduced to pass the output voltage deviation from VOUT to the feedback node FB, and then to the inverting input of the hysteresis comparator 215 with very little attenuation, resulting good output transient responses as well as good DC regulation. The capacitance value of the capacitor 208 is chosen such that the impedance formed by the resistor 206 and the capacitor 208 is much smaller than the impedance formed by the capacitor 213 and resistor 214 at the interested switching frequencies. In some embodiments, the impedance formed by resistor 214 and capacitor 213 is at least five times greater than the impedance formed by the resistor 206 and the capacitor 208.

As shown in FIG. 2, the DC voltage difference between VOUT and the feedback node FB drops across resistors 211, 214 and capacitors 212, 213. Since the capacitor 213 and the resistor 214 are connected in parallel, the DC impedance of these two is determined by the resistor 214. The resistor 211 and the capacitor 212 are connected in series. The DC impedance of these two is determined by the capacitor 212. Furthermore, if the resistors 211 and 214 are designed in such a way that the value of resistor 211 is much larger (e.g., 211 is 10× larger than 214) than that of the resistor 214, the majority of the DC voltage difference between the VOUT node and the feedback node FB drops across the capacitor 212. This relationship has nothing to do with the capacitance of the capacitor 212. For example, this relationship is still valid when the capacitance of the capacitor 212 can be even smaller than that of the capacitor 213.

Figure 1:
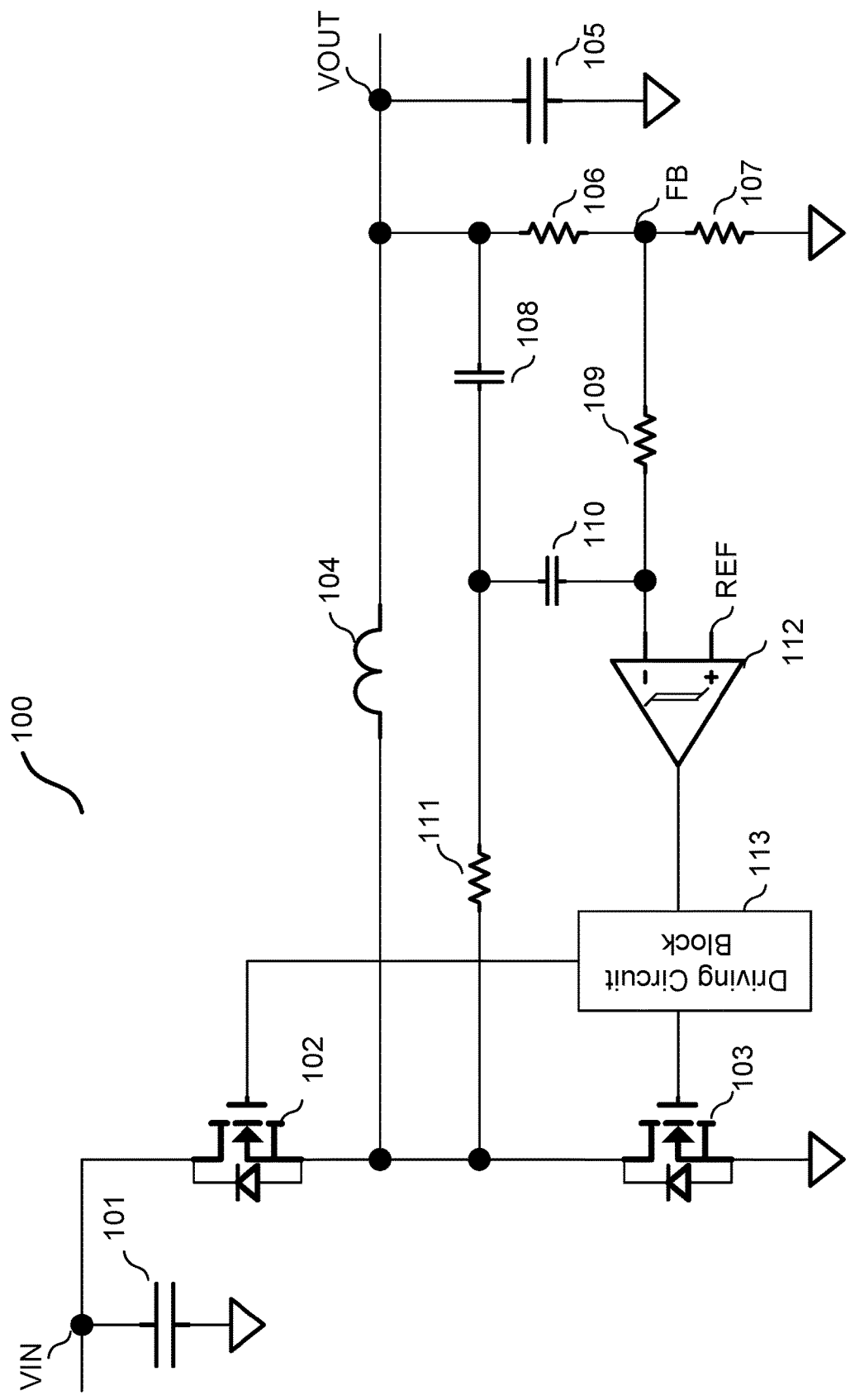
FIG. 1 illustrates a schematic diagram of a power converter.

One advantageous feature of having the power converter shown in FIG. 2 is that all control components can be integrated into a single IC device. Furthermore, most of the voltage across the DCR of the output inductor due to the output current also drops across the capacitor 212 at steady state. During an output load transient event, when the output current varies, the voltage across the DCR of the output inductor varies too. The voltage across the capacitor 212 cannot change instantaneously. Therefore, the varying voltage drops across the resistors 211 and 214. Since the resistance value of the resistor 214 is much smaller than that of the resistor 211, the majority of the varying voltage drops across the resistor 211. Thus, the voltage level at the inverting input of the hysteresis comparator 215 maintains relatively constant. In comparison with the control circuit shown in FIG. 1, one skilled the art would understand the capacitor 212 is not in the path between the output node VOUT and the inverting input of the hysteresis comparator 215 during an output load transient event. Thus, the capacitor 212 does not cause a capacitor divider effect.

Figure 3:
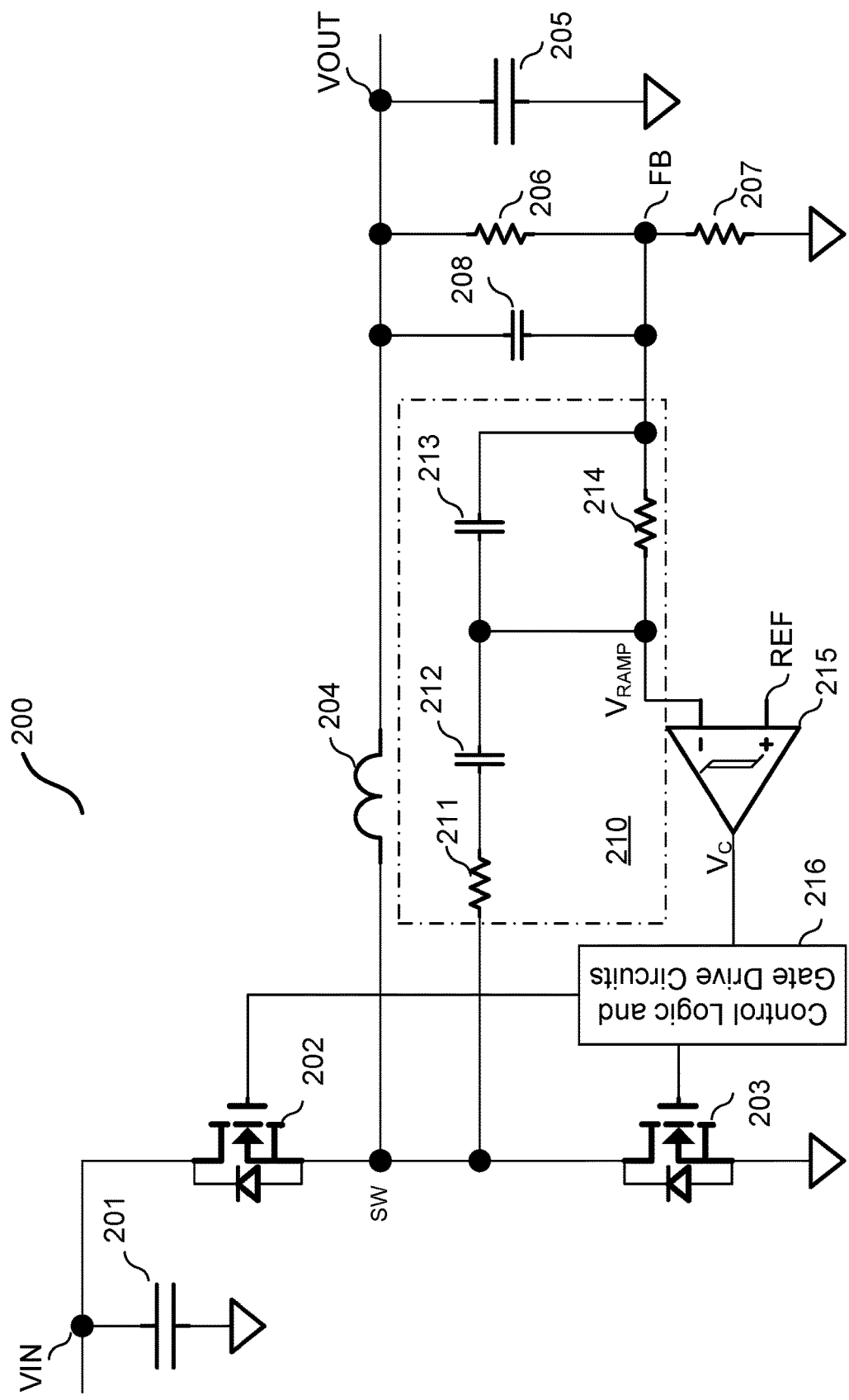
FIG. 3 illustrates a schematic diagram of the power converter shown in FIG. 2 when the power converter is configured to operate in a PWM mode in accordance with various embodiments of the present disclosure.

FIG. 3 illustrates a schematic diagram of the power converter shown in FIG. 2 when the power converter is configured to operate in a PWM mode in accordance with various embodiments of the present disclosure. Once the power converter shown in FIG. 2 is configured to operate in the PWM mode, control switches S2 and S3 shown in FIG. 2 are turned on, and control switch S1 is turned off. The circuit shown in FIG. 2 can be simplified as the circuit shown in FIG. 3.

As shown in FIG. 3, the PWM ramp generator 210 comprises a first resistor 211 and a first capacitor 212 connected in series between the switching node SW and the inverting input of the comparator 215. The PWM ramp generator 210 further comprises a second resistor 214 and a second capacitor 213 connected in parallel between the inverting input of the comparator 215 and the feedback node FB. The resistor 214 provides a path for the leakage current flowing out of the inverting input of the comparator 215. Furthermore, the resistor 214 can eliminate the effect of the voltage divider formed by capacitors 212 and 213. As a result, the majority of the DC voltage difference between VOUT and the feedback node FB drops across the capacitor 212 regardless of the capacitance value of the capacitor 212.

In operation, the resistors 211, 214, and the capacitors 212 and 213 are employed to generate a saw tooth like ramp voltage $V_{RAMP}$ applied to the inverting input of the comparator 215. In particular, the voltage on the switching node SW is pulled up to the input voltage VIN after the high-side switch 202 is turned on. The voltage on the switching node SW is pulled down to ground after the high-side switch 202 is turned off and the low-side switch 203 is turned on. When the voltage on the switching node SW is pulled up to VIN, the capacitor 213 is charged by the voltage on SW through the resistor 211 and the capacitor 212. When the voltage on the switching node SW is pulled down to ground, the capacitor 213 is discharged through the resistor 211 and the capacitor 212. As a result, a ramp voltage $V_{RAMP}$ is generated across the capacitor 213.

Furthermore, the voltage across the capacitor 213 is connected to the feedback node FB. When the feedback voltage on the feedback node FB moves up and down, the voltage at the inverting input of the comparator 215 moves up and down accordingly. In some embodiments, the capacitance of the capacitor 208 is much larger than that of the capacitor 213. Since the capacitor value of the capacitor 208 is much larger than that of capacitor 213, any voltage deviation at VOUT is passed to the feedback node FB through the capacitor 208 with little attenuation. This feature helps the power converter 200 archive a fast transient response during an output transient event.

The amplitude of the ramp voltage $V_{RAMP}$ across the capacitor 213 can be adjusted by adjusting a time constant. The time constant τ is given by the following equation:

$$\tau = \left(\frac{R211 \times R214}{R211 + R214}\right) \times C213 \qquad (2)$$

In Equation (2), R211 is the resistance of the resistor 211. R214 is the resistance of the resistor 214. C213 is the capacitance of the capacitor 213. In some embodiments, the time constant τ should be much larger than the interested PWM switching period. For example, the time constant τ is at least five times greater than the interested PWM switching period.

The time constant determined by Equation (2) determines the gain of the hysteresis comparator. The gain has an impact on the stability of the close loop performance of the power converter 200. Once the values of resistors 211, 214 and capacitors 212, 213 are determined, the amplitude of the ramp voltage across the capacitor 213 is function of the input voltage and the output voltage. The amplitude changes for different input and output voltages are independent of the output load current.

Figure 4:
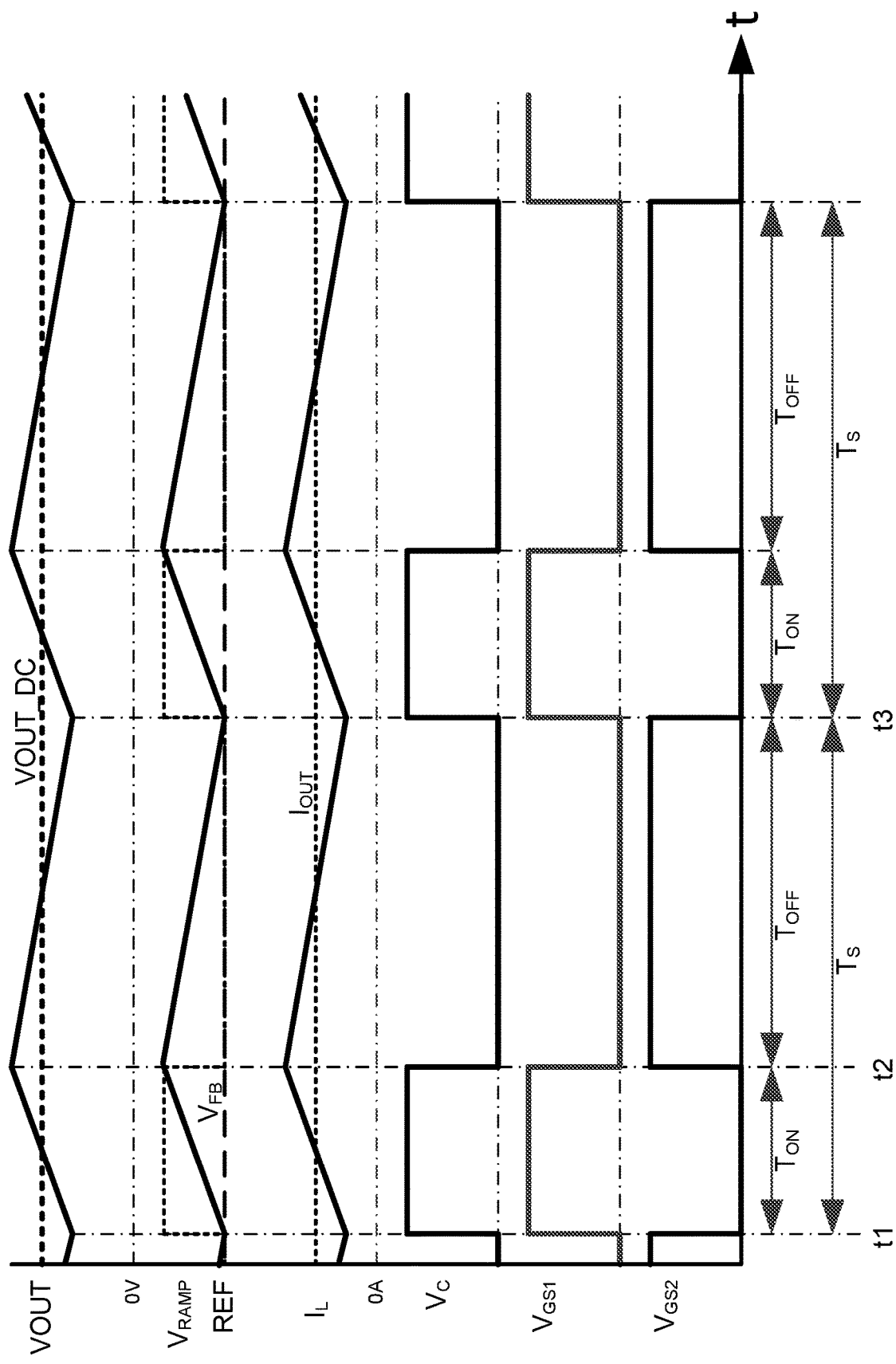
FIG. 4 illustrates various signals associated with the power converter shown in FIG. 3 in accordance with various embodiments of the present disclosure.

In some embodiments, the voltage REF at the non-inverting input of the comparator 215 includes a square waveform (not shown but illustrated in FIG. 4). The peak and valley values of the square waveform represent the trigger thresholds of the comparator 215 to turn on and turn off the high-side switch 202, respectively. The difference between the peak and valley values of the square waveform represents the hysteresis of the comparator 215. This difference determines the switching frequency of the power converter 200. The threshold (i.e. the difference between the peak and valley values) can be adjusted to obtain a constant switching frequency over a wide input and/or output voltage range.

It should be noted that if under the hysteresis control, the power converter 200 is required to operate in a constant switching frequency, a phase lock loop (PLL) circuit can be employed to adjust the difference between the peak and valley values of the REF voltage to keep the switching frequency constant over a wide input and/or output voltage range.

FIG. 4 illustrates various signals associated with the power converter shown in FIG. 3 in accordance with various embodiments of the present disclosure. The horizontal axis represents intervals of time. There are six rows. The first row represents the output voltage of the power converter shown in FIG. 3. The second row represents the ramp voltage $V_{RAMP}$ and the reference voltage REF. The solid line of the second row represents the ramp voltage $V_{RAMP}$. The dotted line represents the square waveform portion of the reference voltage REF. The third row represents the current $I_L$ flowing through the inductor of the power converter. The fourth row represents the output voltage (Vc) of the comparator 215. The fifth row represents the gate drive signal $V_{GS1}$ of the high-side switch of the power converter. The sixth row represents the gate drive signal $V_{GS2}$ of the low-side switch of the power converter.

At t1, the high-side switch 202 is turned on. The reference voltage REF jumps from a valley value to a peak value. From t1 to t2, the high-side switch 202 is on. The capacitor 213 is charged by the input voltage VIN, which is applied to the switching node SW once the high-side switch 202 is on. At t2, since the voltage at the inverting input of the comparator 215 reaches the peak value of the reference voltage REF, the comparator 215 triggers. The output of the comparator 215 generates signals to turn off the high-side switch 202, and turn on the low-side switch 203 through the control logic and gate drive circuits 216. At t2, the reference voltage REF switches back to its valley value to keep the output status of the comparator 215.

During the time interval (from t2 to t3) in which the low-side switch 203 is on, the switching node SW is pulled down to ground by the low-side switch 203. The capacitor 213 is discharged and the voltage at the inverting input of the comparator 215 decreases. At t3, the voltage at inverting input reaches the valley value of the reference voltage REF. In response to this, the comparator 215 triggers. The output of the comparator 215 generates signals to turn off the low-side switch 203, and turn on the high-side switch 202 through the control logic and gate drive circuits 216. At t3, the switching cycles repeats as shown in FIG. 4.

In operation, various voltage deviations may occur at the output of the power converter 200. The voltage deviations are caused by either a line transient or an output load transient. Depending on different operating conditions, the voltage deviation may be either an overshoot or an undershoot. Furthermore, the voltage deviation may occur in any time durations shown in FIG. 4 (e.g., from t1 to t2 or from t2 to t3). The control circuit shown in FIG. 3 is able to provide a fast transient response to maintain the output voltage within specification limits. The discussion below explains how the control circuit shown in FIG. 3 is able to provide a fast transient response under different voltage deviations.

In operation, if the voltage deviation is in an undershoot condition, and the high-side switch 202 is on (from t1 to t2), the voltage deviation causes the voltage at the inverting input of the comparator 215 to decrease. As shown in FIG. 4, the decreased voltage at the inverting input of the comparator 215 increases the conduction time of the high-side switch 202. The increased conduction time of the high-side switch 202 helps to increase the output voltage, thereby reducing the voltage deviation. On the other hand, if the voltage deviation is in an undershoot condition, and the low-side switch 203 is on (from t2 to t3), the voltage deviation causes a voltage dip at the inverting input of the comparator 215. According to the operating principle shown FIG. 4, the voltage dip at the inverting input of the comparator 215 shortens the conduction time of the low-side switch 203. The reduced conduction time of the low-side switch 203 helps to increase the output voltage, thereby reducing the voltage deviation.

In operation, if the voltage deviation is in an overshoot condition, and the high-side switch 202 is on (from t1 to t2), the voltage deviation causes the voltage at the inverting input of the comparator 215 to increase. According to the operating principle shown FIG. 4, the increased voltage at the inverting input of the comparator 215 reduces the conduction time of the high-side switch 202. The reduced conduction time of the high-side switch 202 helps to reduce the output voltage, thereby reducing the voltage deviation. On the other hand, if the voltage deviation is in an overshoot condition, and the low-side switch 203 is on (from t2 to t3), the voltage deviation causes a voltage overshoot at the inverting input of the comparator 215. According to the operating principle shown FIG. 4, the voltage overshoot at the inverting input of the comparator 215 increases the conduction time interval of the low-side switch 203. The increased conduction time of the low-side switch 203 helps to reduce the output voltage, thereby reducing the voltage deviation.

From the description above, one skilled in the art can draw the conclusion that the power converter 200 under the hysteresis control can response to the output voltage deviation instantly regardless of which switch (switch 202 or switch 203) is on at the time when the deviation event occurs. In comparison with the power converter shown in FIG. 1, the power converter 200 shown in FIG. 3 is able to provide the fastest output transient response and the control circuit of the power converter 200 can be integrated in one single IC.

Figure 5:
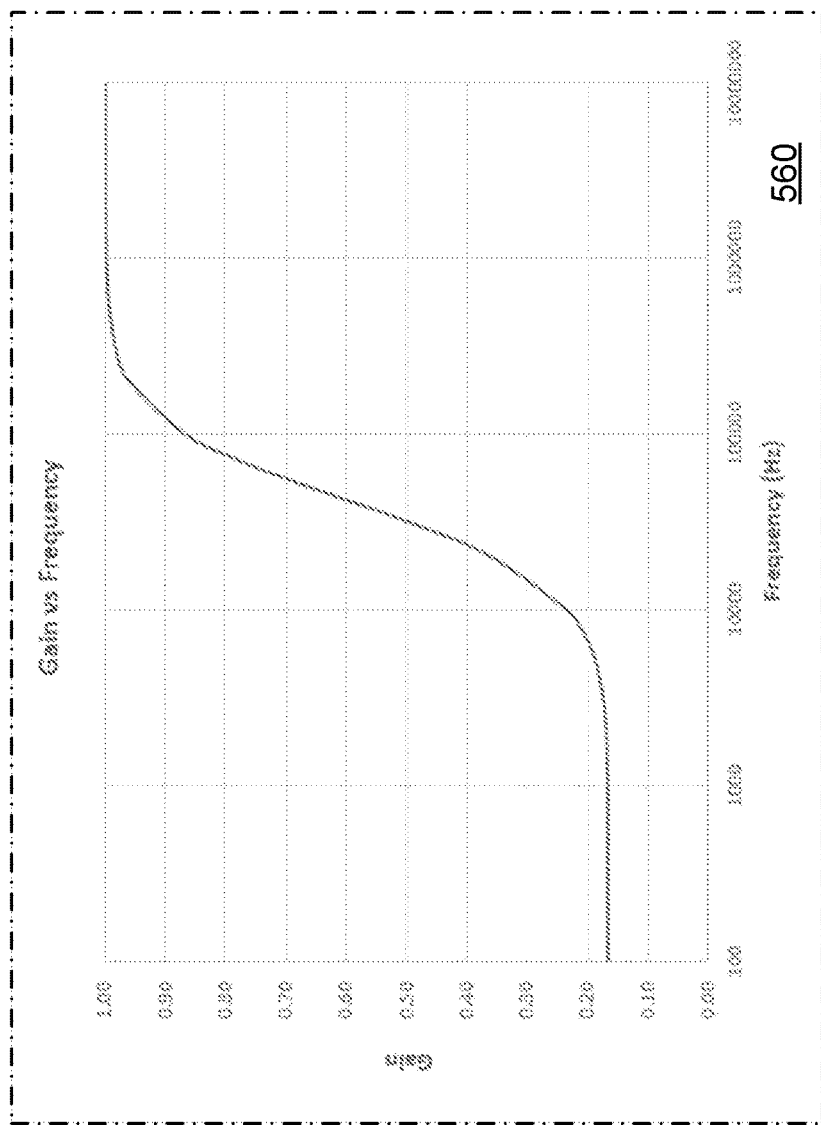
FIG. 5 illustrates a gain versus frequency response curve of the feedback divider network in accordance with various embodiments of the present disclosure.
Figure 5:
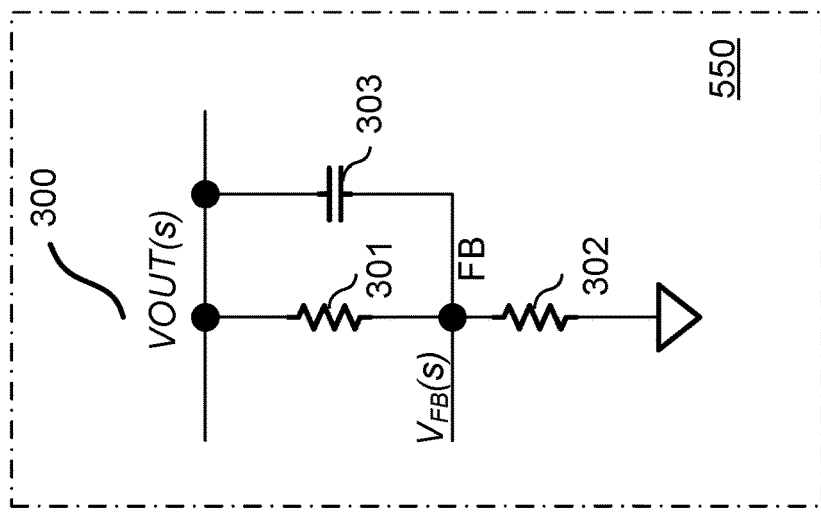
Figure 6:
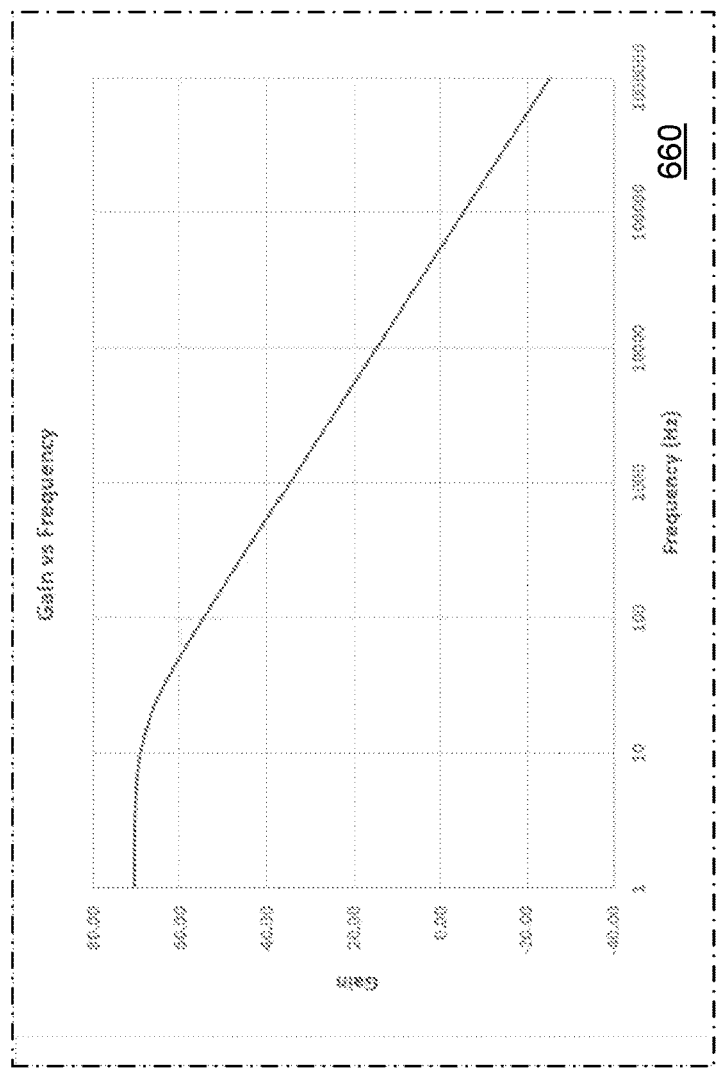
FIG. 6 illustrates a gain versus frequency response curve of an error amplifier having a dominant pole in accordance with various embodiments of the present disclosure.
Figure 6:
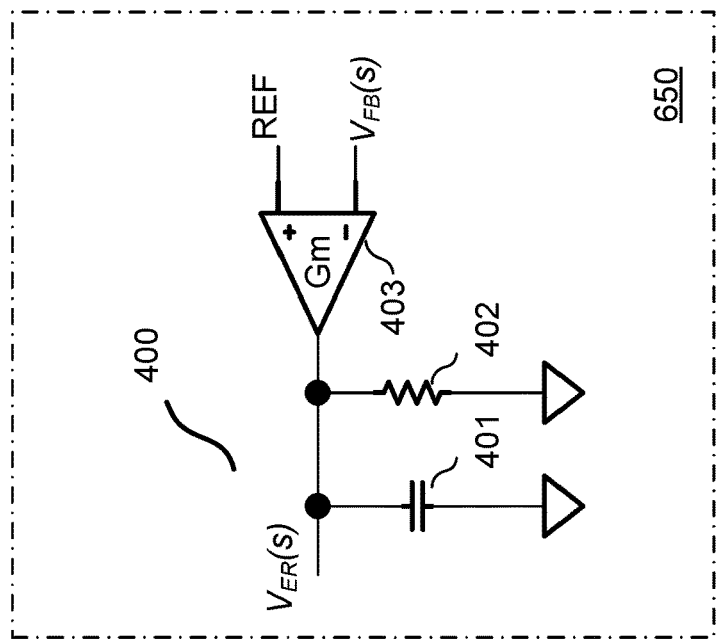

In some applications, the power converter may be configured to operate in a very light load condition. In the light load condition, the power converter is configured to operate in the PFM mode to reduce power losses. In the PFM mode, an error amplifier is employed to improve the performance of the control circuit. FIGS. 5-6 below explain why a dominant pole error amplifier is employed in the PFM mode.

FIG. 5 illustrates a gain versus frequency response curve of the feedback divider network in accordance with various embodiments of the present disclosure. The output feedback divider network 300 is shown in the dashed rectangle 550. The resistors 301 and 302 determines the output voltage. The output voltage (VOUT) of the power converter can be expressed by the following equation:

$$VOUT = (1 + R301/R302) \times REF \quad (3)$$

In Equation (3), R301 is the resistance value of the resistor 301. R302 is the resistance value of the resistor 302. The feedback node FB is connected to a first input of an error amplifier. REF is connected to a second input of the error amplifier. REF is a predetermined reference voltage.

The capacitor 303 helps the control circuit improve the output transient response. The gain of the voltage at FB node over the output voltage VOUT is expressed by the following equation:

$$\text{Gain} = V_{FB}(S)/VOUT(S) \quad (4)$$

The gain in Equation (4) is plotted in the dashed rectangle 560. As shown in FIG. 5, the attenuation provided by resistors 301 and 302 diminishes as the frequency increases. Once the frequency reaches a level above 100 kHz, there is very little attenuation. In the PFM mode operation, the switching frequency is a function of the output load current. Under different load currents, the switching frequency varies in a wide range from a few hertz up to several megahertz.

In the traditional PFM operation of a hysteresis controller, the output ripple voltage is fed into the inverting input of the comparator directly. Such an implementation is simple and effective. However, this implementation cannot be operated with an output of the feedback divider. As shown in FIG. 5, the gain at a frequency less than 10 kHz is about 0.17. This means that a 20-mV ripple voltage at the output VOUT can generate a voltage deviation of about 20 mV at the feedback node FB without any attenuation when the PFM switching frequency is 1 Megahertz. In contrast, a 20-mV ripple voltage at the output VOUT can generate a voltage deviation of about 3.4 mV at the feedback node FB with attenuation when the PFM switching frequency is 10 kHz. Such a small output ripple voltage at the feedback node FB fed to the inverting input of the comparator may cause a false trigger, thereby resulting in frequency jittering and irregular output ripple voltages. To solve false trigger issue, a voltage error amplifier having a dominant pole is introduced to improve the performance of the power converter in the PFM mode.

FIG. 6 illustrates a gain versus frequency response curve of an error amplifier having a dominant pole in accordance with various embodiments of the present disclosure. The error amplifier having a dominant pole is illustrated in the dashed rectangle 650. In some embodiments, the error amplifier is implemented as a transconductance operational amplifier 403. A resistor 402 and a capacitor 401 are connected in parallel between the output of the error amplifier 403 and ground. The frequency of the dominant pole is determined by the product of the capacitance of the capacitor 401 and the resistance of the resistor 402. The DC gain is determined by the product of Gm (the gain of the transconductance operational amplifier) and the resistance of the resistor 402. The gain of the voltage $V_{ER}$ at the output of the error amplifier over the voltage $V_{FB}$ at the feedback node FB is expressed by the following equation:

$$\text{Gain}=V_{ER}(S)/V_{FB}(S) \quad (5)$$

The gain is plotted in the dashed rectangle 660. As shown in FIG. 6, the gain is very high (about 70 dB) when the frequency is less than 10 Hz, and the gain is below 0 dB when frequency is above 100 kHz. The gain shown in FIG. 6 indicates the voltage on the feedback node FB is amplified if the switching frequency is less than 100 kHz. The voltage on the feedback node FB is attenuated if the frequency is above 100 kHz. The error amplifier 403 shown in FIG. 6 will be used in the PFM operation, which will be discussed below with respect to FIGS. 8-13.

Figure 8:
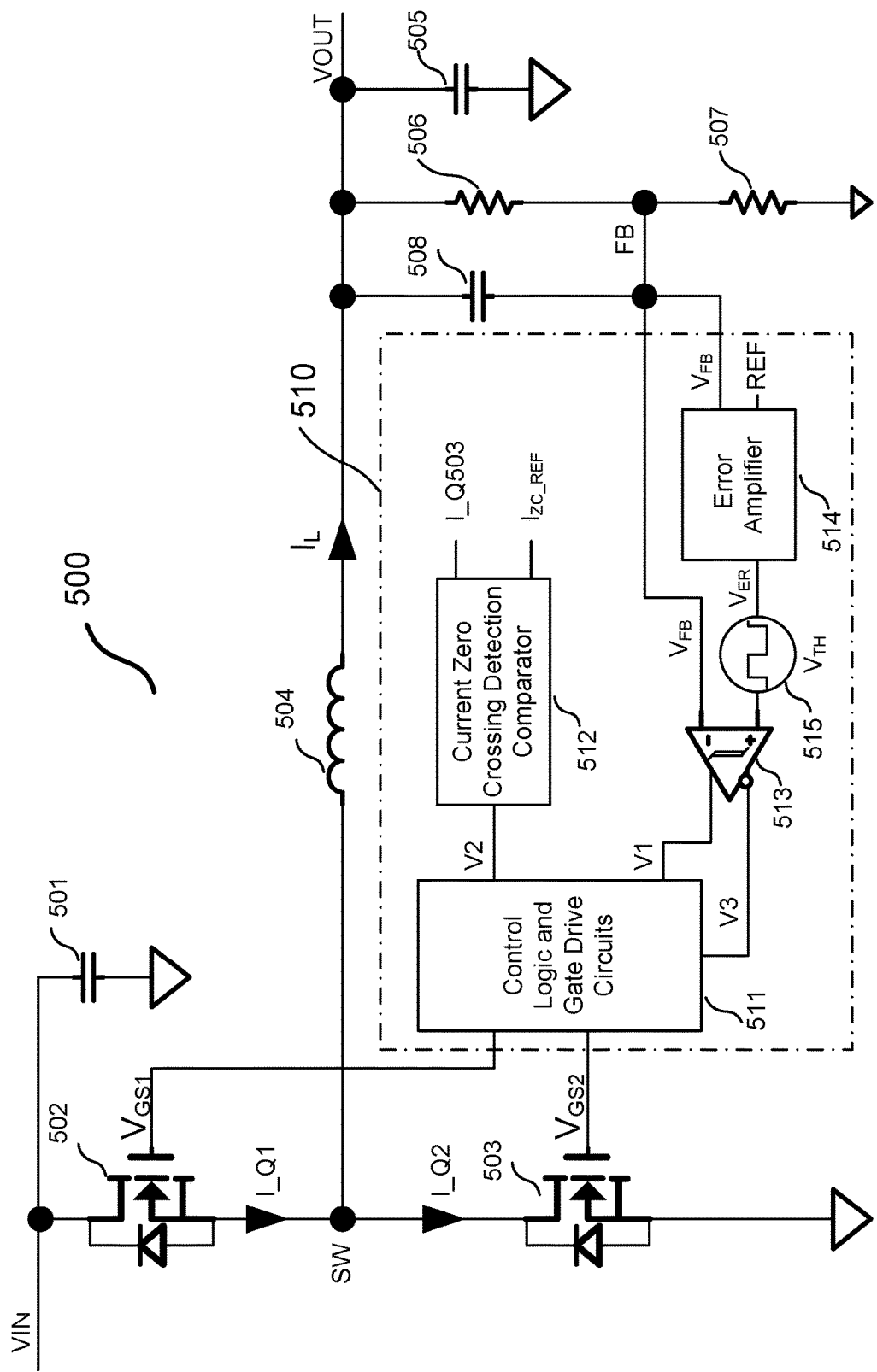
FIG. 8 illustrates a first implementation of the PFM control circuit in accordance with various embodiments of the present disclosure.

It should be noted that the dominant pole of the error amplifier 403 should be designed such that a 0 dB frequency is higher than the pole frequency formed by a feedback divider (e.g., the pole formed by resistors 506, 507, and feedforward capacitor 508 shown in FIG. 8).

Figure 7:
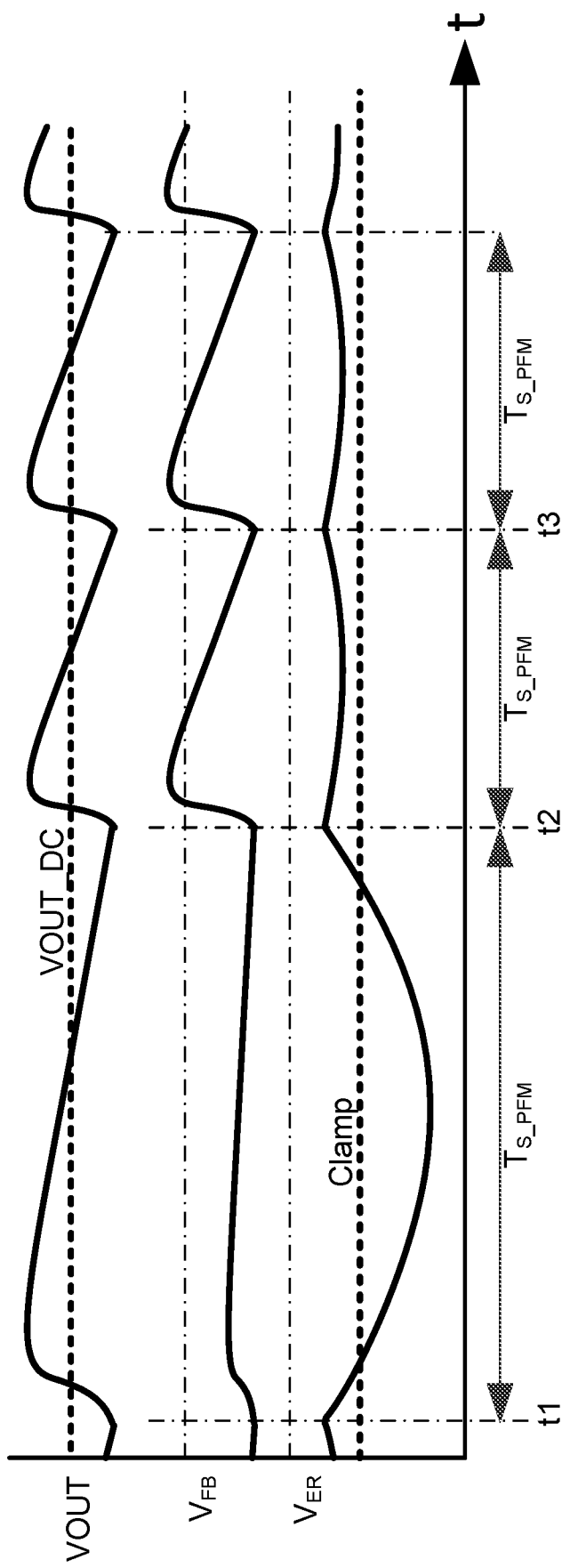
FIG. 7 illustrates various signals associated with the error amplifier shown in FIG. 6 in accordance with various embodiments of the present disclosure.

FIG. 7 illustrates various signals associated with the error amplifier shown in FIG. 6 in accordance with various embodiments of the present disclosure. The horizontal axis represents intervals of time. There are three rows. The first row represents the output voltage of the power converter. The second row represents the voltage $V_{FB}$ on the feedback node FB. The third row represents the voltage $V_{ER}$ at the output of the error amplifier.

As shown in FIG. 7, the error amplifier is able to improve the noise immunity of the FPM hysteresis comparator if the ripple voltage on the feedback node FB is compared with the output voltage of the voltage error amplifier at a low PFM operating frequency. As shown in FIG. 7, from t1 to t2, the output voltage of the voltage error amplifier may drop below a predetermined clamping point. In order to improve the output transient responses during the PFM mode operation, an active clamp (not shown) can be used to prevent the output of the error amplifier from going too low at a very low frequency. For example, from t1 to t2, the output of the error amplifier is clamped so as to keep the output of the error amplifier over a predetermined clamping point (Clamp shown in FIG. 7).

FIG. 8 illustrates a first implementation of the PFM control circuit in accordance with various embodiments of the present disclosure. Referring back to FIG. 2, when the power converter is configured to operate in the PFM mode, S2 and S3 shown in FIG. 2 are turned off, and S1 is turned on. The circuit shown in FIG. 2 can be simplified as the circuit shown in FIG. 8. In the first implementation of the PFM control circuit, a threshold voltage generator 515 is added into the PFM control circuit. As shown in FIG. 8, the threshold voltage generator 515 is coupled between the second input of the comparator 513 and an output of the error amplifier 514. As shown in FIG. 8, the function units in the dashed rectangle 510 are the PFM control circuit of the power converter 500.

As shown in FIG. 8, the power converter 500 comprises a buck power stage, an output feedback divider, and the PFM control circuit. The buck power stage comprises an input filtering capacitor 501, power switches 502, 503, an output inductor 504 and an output filter capacitor 505. The output feedback divider comprises resistors 506, 507, and a feedforward capacitor 508. The PFM control circuit comprises control logic and gate drive circuits 511, a current zero crossing detection comparator 512, a comparator 513, a threshold voltage generator 515 and an error amplifier 514.

In some embodiments, the error amplifier 514 is a transconductance operation amplifier having a dominant pole such as the error amplifier shown in FIG. 6. Referring back to FIG. 6, the capacitor 401 and the resistor 402 are connected in parallel between the output of the error amplifier and ground. The capacitor 401 and the resistor 402 form the dominant pole.

In some embodiments, a non-inverting input of the error amplifier 514 is connected to a predetermined reference REF. An inverting input of the error amplifier 514 is connected to the feedback node as shown in FIG. 6.

In operation, a comparison of a voltage $V_{FB}$ on the feedback node, and a sum of an output voltage $V_{ER}$ of the error amplifier 514 and a threshold voltage V-r from the threshold voltage generator 515 is used to determine an on-time of the high-side switch 502 of the power converter 500. A comparison of the voltage $V_{FB}$ on the feedback node and the output voltage $V_{ER}$ of the error amplifier 514 is used to determine a turn-on instant of the high-side switch 502 of the power converter 500. The current zero crossing detection comparator 512 is configured to determine an on-time of the low-side switch 503 of the power converter 500 once a current flowing through the low-side switch of the power converter reaches zero.

Figure 9:
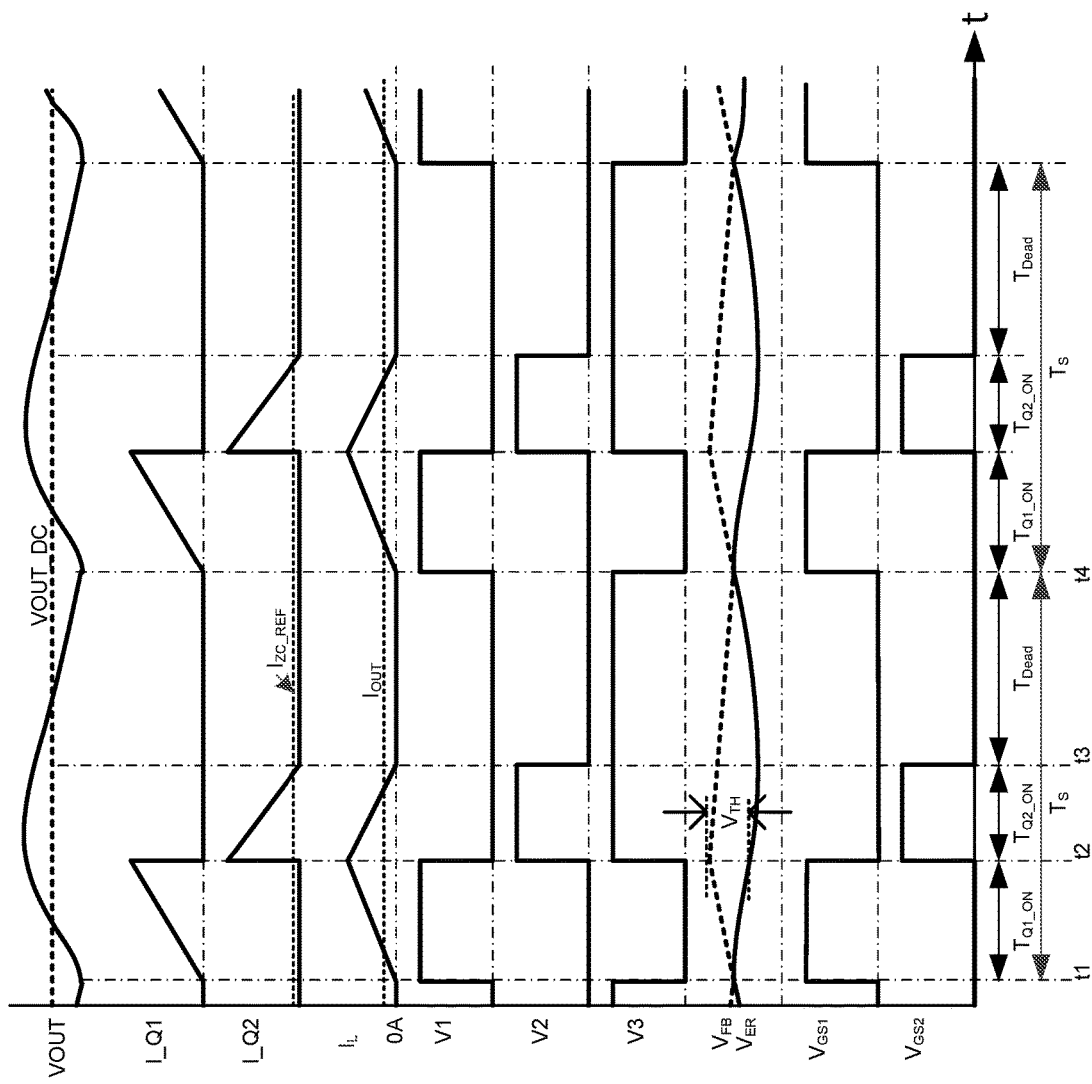
FIG. 9 illustrates various voltage and current signals associated with the first implementation of the PFM control circuit shown in FIG. 8 in accordance with various embodiments of the present disclosure.

FIG. 9 illustrates various voltage and current signals associated with the first implementation of the PFM control circuit shown in FIG. 8 in accordance with various embodiments of the present disclosure. The horizontal axis represents intervals of time. There are ten rows. The first row represents the output voltage of the power converter shown in FIG. 8. The second row represents the current I_Q1 flowing through the high-side switch of the power converter. The third row represents the current I_Q2 flowing through the low-side switch of the power converter. The fourth row represents the current $I_L$ flowing through the inductor of the power converter. The fifth row represents the signal V1 shown in FIG. 8. The sixth row represents the signal V2 shown in FIG. 8. The seventh row represents the signal V3 shown in FIG. 8. The eighth row represents the output voltage $V_{ER}$ of the error amplifier and the voltage $V_{FB}$ on the feedback node. The solid line is $V_{ER}$, and the dashed line is $V_{FB}$. The ninth row represents the gate drive signal $V_{GS1}$ of the high-side switch of the power converter. The tenth row represents the gate drive signal $V_{GS2}$ of the low-side switch of the power converter.

In operation, during the time interval (from t1 to t2) in which the high-side switch 502 is on, the inductor current $I_L$ is charged from zero, and the output ripple voltage increases. In response to the increased output ripple voltage, the voltage on the feedback node FB increases too. Since the voltage on the feedback node FB is fed into the inverting input of the error amplifier (shown in FIG. 6), the output voltage $V_{ER}$ of the voltage error amplifier decreases. Once the voltage on the feedback node FB increases to a certain value at which the voltage at the inverting input of the comparator 513 exceeds the sum of the threshold voltage $V_{TH}$ and the output voltage $V_{ER}$ of the voltage error amplifier, the output of the comparator 513 triggers (from a logic high state to a logic low state). In response to this logic state change, the logic signal V1 flips from a logic high state to a logic low state at t2. The logic signal V3 flips from a logic low state to a logic high state at t2.

In response to the changes of the logic signals V1 and V3, the control logic and gate drive circuits 511 turn off the high-side switch 502 and turn on the low-side switch 503 at t2 as shown in FIG. 9. Once the low-side switch 503 is turned on, the current zero crossing detection comparator 512 is enabled to monitor the current (I_Q503) flowing through the low-side switch 503, and the logic signal V2 changes from a logic low state to a logic high state at t2. Once the current flowing through the low-side switch 503 reaches zero ($I_{ZC\_REF}$) as shown in FIG. 8, the logic signal V2 changes from a logic high state to a logic low state at t3. This logic state change of V2 causes the control logic and gate drive circuits 511 to turn off the low-side switch 503 at t3, and keep the high-side switch 502 off as shown in FIG. 9.

At t3, the threshold voltage from the threshold voltage generator 515 is removed. In other words, the output of the voltage error amplifier is connected to the comparator directly. During the time interval from t3 to t4, both switches 502 and 503 are off. The output voltage of the power converter decreases since the output load current is maintained by discharging the output capacitor 505.

At t4, the voltage ($V_{FB}$) at the inverting input of the comparator 513 reaches the output voltage of the voltage error amplifier. As shown in FIG. 9, the control logic signal V3 flips from a logic high state to a logic low state. The control logic signal V1 flips from a logic low state to a logic high state. These two logic state changes cause the control logic and gate drive circuits 511 to turn on the high-side switch 502, and keep the low-side switch 503 off. At t4, the hysteresis threshold from the threshold voltage generator 515 is added on top of the output voltage of the error amplifier 514. The output voltage of the power converter starts to increase. Once the output voltage of the power converter increases to a certain value such that the voltage at the inverting input is equal to the voltage at the non-inverting input of the comparator 513, the comparator 513 triggers again, and the operation cycle repeats as shown in FIG. 9.

It should be noted that the threshold voltage $V_{TH}$ can be adjusted to control the energy delivered to the output over each PFM switching cycle. The amount of energy delivered to the output over one PFM cycle also determines the peak-to-peak output ripple voltage in the PFM mode operation.

In operation, when a voltage deviation occurs at the output of the power converter, the voltage at FB node changes accordingly. In some embodiments, the output voltage deviation is in an undershoot condition, and the output voltage deviation occurs at the time interval (e.g., from t3 to t4) when both switches 502 and 503 are off, the output voltage deviation causes a voltage undershoot at the feedback node FB. The voltage undershoot at the feedback node FB pulls the voltage at its inverting input of the comparator 513 low to cross the voltage at the non-inverting input of the comparator 513. According to the operating principle shown in FIG. 9, the comparator 513 triggers to turn on the high-side switch 502 to deliver the energy from the input to the output to hold the output voltage in regulation.

In alternative embodiments, the output undershoot event occurs at the time interval (e.g., from t1 to t2) when the high-side switch 502 is on. The voltage dip at the inverting input of the comparator 513 increases the time to reach the voltage at non-inverting input of the comparator 513. As a result, the high-side switch 502 remains on for a longer time to deliver more energy from the input to the output to keep the output voltage in regulation.

In some embodiments, the output voltage deviation is in an overshoot condition, and the output voltage deviation occurs at the time interval (e.g., from t3 to t4) when both switches 502 and 503 are off, the output voltage overshoot causes the voltage at the inverting input of the comparator 513 to increase. The increased voltage at the inverting input of the comparator 513 causes a delayed trigger. Thus, both switches 502 and 503 remain off for a longer time to reduce the amount of energy delivered to the output over one PFM switching cycle, thereby maintaining the output voltage in regulation.

In alternative embodiments, the output overshoot event occurs at the time interval (e.g., from t1 to t2) when the high-side switch 502 is on. The overshoot causes the voltage at the inverting input of the comparator 513 to increase. The increased voltage at the inverting input of the comparator 513 causes an early trigger of the comparator 513. The early trigger turns off the high-side switch 502 to reduce the energy delivered to the output over one PFM switching cycle, thereby maintaining the output voltage in regulation.

It should be noted that the transient responses described above may result in the frequency change of the PFM mode.

From the description above, one skilled in the art would recognize the voltage threshold $V_{TH}$ determines the amount of energy deliver to the output of the power converter over one PFM switching cycle. The voltage threshold $V_{TH}$ also determines the peak-to-peak output ripple voltage during the PFM operation. The threshold voltage $V_{TH}$ can be adjusted based on the input voltage and the output voltage to keep the output ripple voltage in the PFM mode relatively constant.

Figure 10:
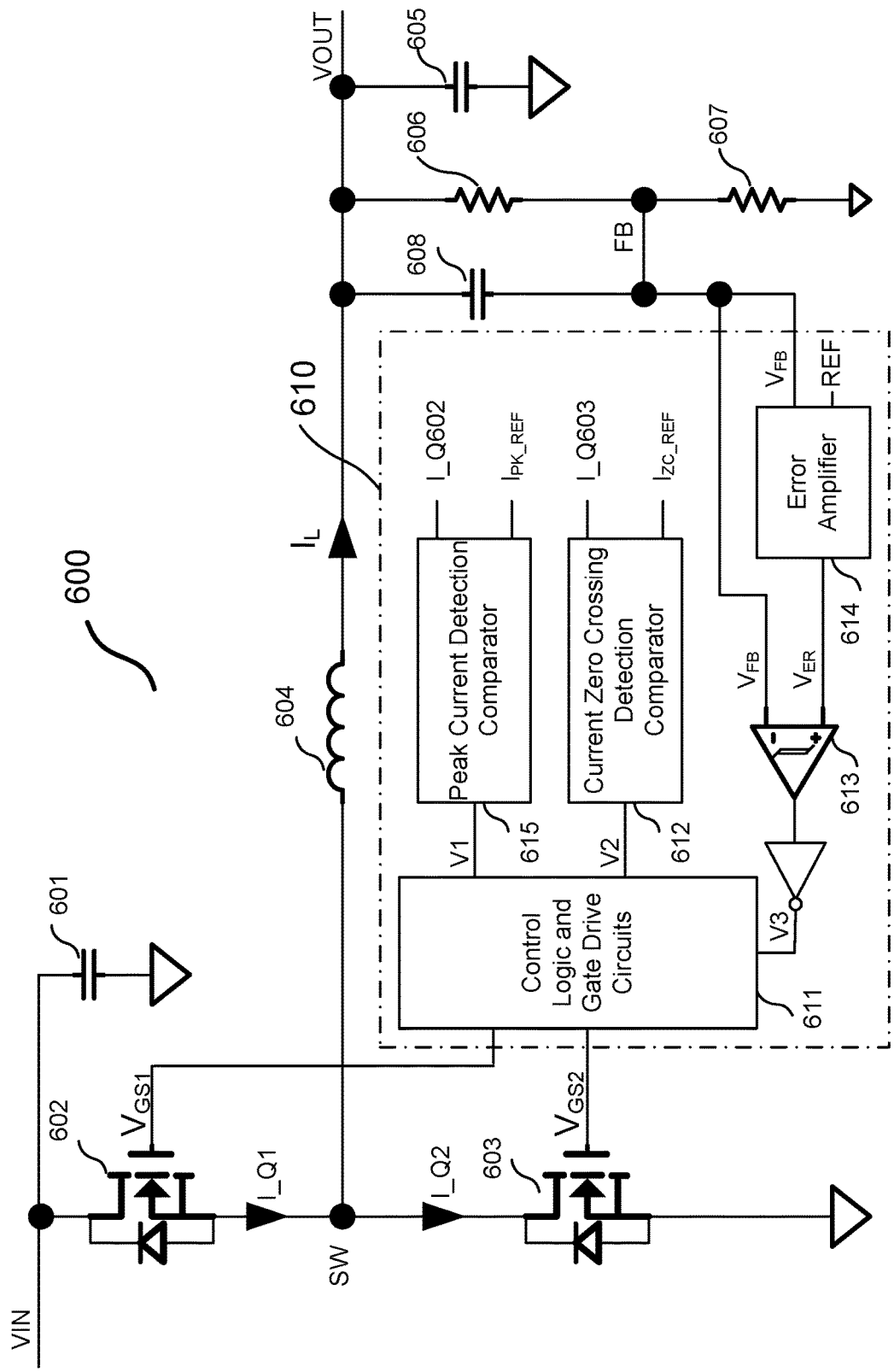
FIG. 10 illustrates a second implementation of the PFM control circuit in accordance with various embodiments of the present disclosure.

FIG. 10 illustrates a second implementation of the PFM control circuit in accordance with various embodiments of the present disclosure. Referring back to FIG. 2, when the power converter is configured to operate in the PFM mode, S2 and S3 shown in FIG. 2 are turned off, and S1 is turned on. The circuit shown in FIG. 2 can be simplified as the circuit shown in FIG. 10. In the second implementation of the PFM control circuit, a peak current detection comparator 615 is added into the PFM control circuit. As shown in FIG. 10, the peak current detection comparator 615 is configured to receive the current (I_Q602) flowing through the high-side switch 602 and a predetermined peak current reference $I_{PK\_REF}$. As shown in FIG. 10, the function units in the dashed rectangle 610 are the PFM control circuit of the power converter 600.

As shown in FIG. 10, the power converter 600 comprises a buck power stage, an output feedback divider, and the PFM control circuit. The buck power stage comprises an input filtering capacitor 601, power switches 602, 603, an output inductor 604 and an output filter capacitor 605. The output feedback divider comprises resistors 606, 607 and a feedforward capacitor 608. The PFM control circuit comprises control logic and gate drive circuits 611, a current zero crossing detection comparator 612, a comparator 613, a peak current detection comparator 615 and an error amplifier 614.

In some embodiments, the error amplifier 614 is a transconductance operation amplifier having a dominant pole such as the error amplifier shown in FIG. 6. Referring back to FIG. 6, the capacitor 401 and the resistor 402 are connected in parallel between the output of the error amplifier and ground. The capacitor 401 and the resistor 402 form the dominant pole.

In operation, a comparison of a current of the high-side switch 602 (I_Q602) and the peak current reference $I_{PK\_REF}$ at the peak current detection comparator 615 is used to determine an on-time of the high-side switch 602 of the power converter 600. A comparison of the voltage on the feedback node and the output voltage of the error amplifier is used to determine a turn-on instant of the high-side switch 602 of the power converter 600. The current zero crossing detection comparator 612 is configured to determine an on-time of the low-side switch 603 of the power converter 600 once a current flowing through the low-side switch of the power converter reaches zero.

Figure 11:
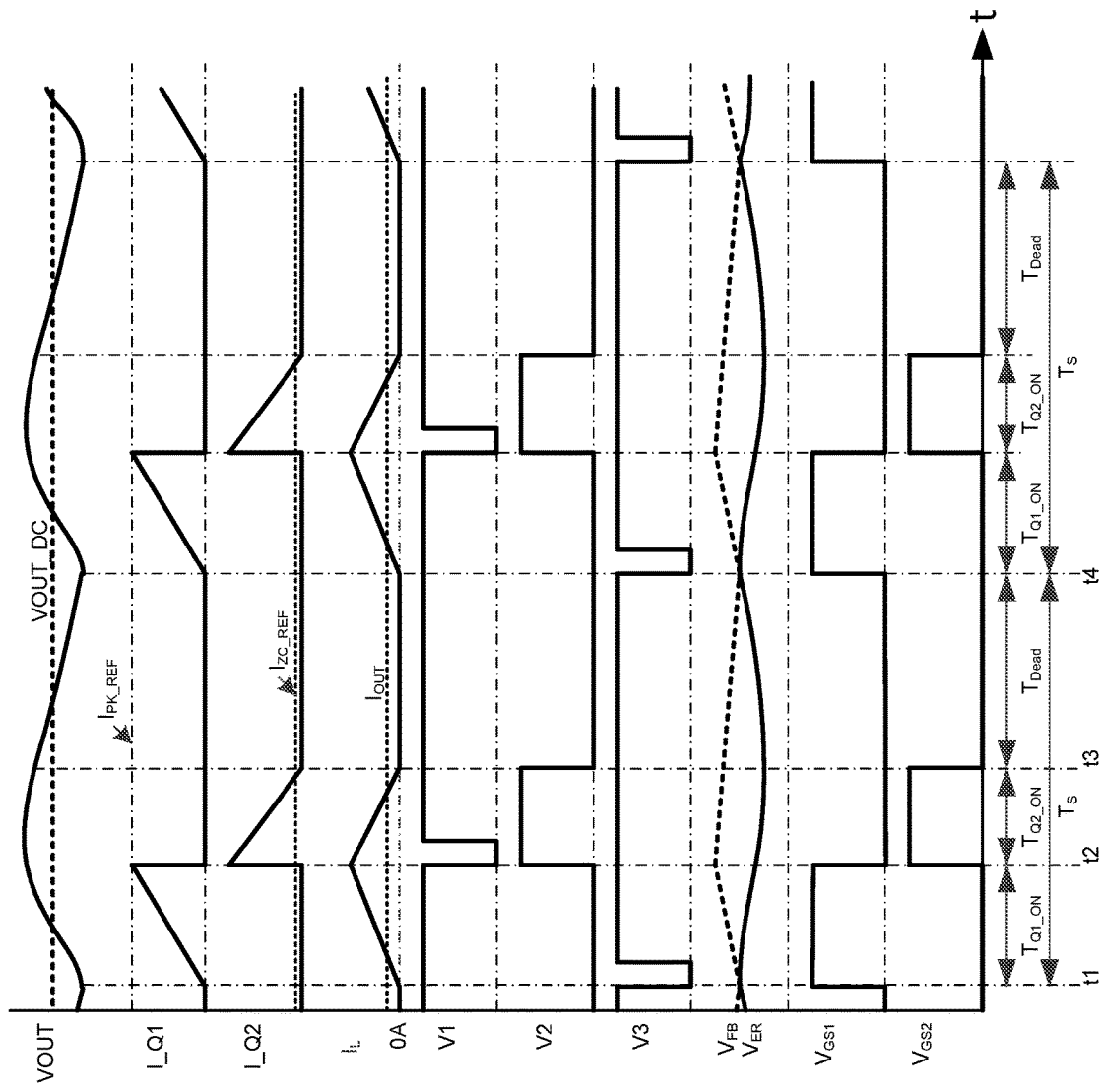
FIG. 11 illustrates various voltage and current signals associated with the second implementation of the PFM control circuit shown in FIG. 10 in accordance with various embodiments of the present disclosure.

FIG. 11 illustrates various voltage and current signals associated with the second implementation of the PFM control circuit shown in FIG. 10 in accordance with various embodiments of the present disclosure. The horizontal axis represents intervals of time. There are ten rows. The first row represents the output voltage of the power converter shown in FIG. 10. The second row represents the current I_Q1 flowing through the high-side switch of the power converter. The third row represents the current I_Q2 flowing through the low-side switch of the power converter. The fourth row represents the current $I_L$ flowing through the inductor of the power converter. The fifth row represents the signal V1 shown in FIG. 10. The sixth row represents the signal V2 shown in FIG. 10. The seventh row represents the signal V3 shown in FIG. 10. The eighth row represents the output voltage $V_{ER}$a of the error amplifier and the voltage $V_{FB}$ on the feedback node. The solid line is $V_{ER}$, and the dashed line is $V_{FB}$. The ninth row represents the gate drive signal $V_{GS1}$ of the high-side switch of the power converter. The tenth row represents the gate drive signal $V_{GS2}$ of the low-side switch of the power converter.

In operation, during the time interval (from t1 to t2) in which the high-side switch 602 is on, the inductor current $I_L$ is charged from zero, and the output ripple voltage increases. In response to the increased output ripple voltage, the voltage on the feedback node FB increases too. Since the voltage on the feedback node FB is fed into the inverting input of the error amplifier (shown in FIG. 6), the output voltage of the voltage error amplifier decreases. Once the output inductor current reaches a pre-determined threshold $I_{PK\_REF}$, the peak current detection comparator 615 triggers at t2 and generates a short low pulse at the control logic signal V1 (from a logic high state to a logic low state at t2). In response to this short low pulse, the control logic and gate drive circuits 611 turn off the high-side switch 602 and turn on the low-side switch 603 at t2 as shown in FIG. 11.

Once the low-side switch 603 is turned on, the current zero crossing detection comparator 612 is enabled to monitor the current (I_Q603) flowing through the low-side switch 603, and the logic signal V2 changes from a logic low state to a logic high state at t2. Once the current flowing through the low-side switch 603 reaches zero, the logic signal V2 changes from a logic high state to a logic low state at t3. This logic state change of V2 causes the control logic and gate drive circuits 611 to turn off the low-side switch 603 at t3, and keep the high-side switch 602 off as shown in FIG. 11.

During the time interval from t3 to t4, both switches 602 and 603 are off. The output voltage of the power converter decreases since the output load current is maintained by discharging the output capacitor 605.

At t4, the voltage ($V_{FB}$) at the inverting input of the comparator 613 reaches the output voltage of the voltage error amplifier. The comparator 613 triggers accordingly. The comparator 613 generates a short low pulse at the control logic signal V3. As shown in FIG. 11, the control logic signal V3 flips from a logic high state to a logic low state at t4. The logic state change of V3 causes the control logic and gate drive circuits 611 to turn on the high-side switch 602, and keep the low-side switch 603 off. The inductor current starts to charge up from zero. Once the inductor current reaches the pre-determined threshold $I_{PK\_REF}$, the peak current detection comparator 615 triggers and generates a short pulse on the control logic signal V1, causing the control logic and gate drive circuits 611 to turn off the power switch 602 and turn on the power switch 603. The control logic signal V2 resets from a logic low state to a logic high state, and the zero current crossing detection comparator 612 is enabled. The PFM mode switching cycle repeats as shown in FIG. 11.

It should be noted that the amount of energy delivered to the output can be controlled by controlling the peak inductor current.

The transient response of the power converter 600 is very similar to that of the power converter 500, and hence is not repeated herein.

Figure 12:
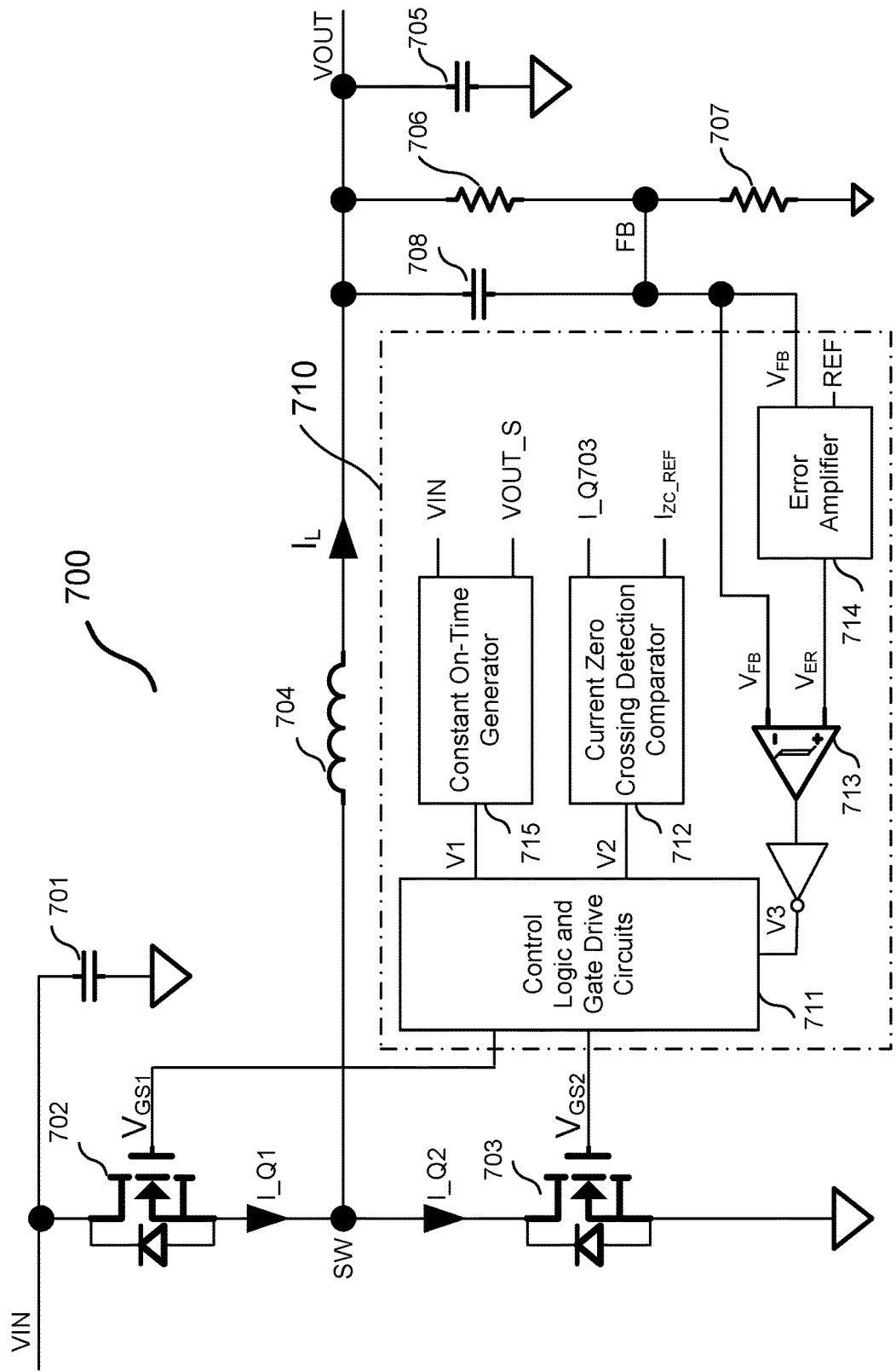
FIG. 12 illustrates a third implementation of the PFM control circuit in accordance with various embodiments of the present disclosure.

FIG. 12 illustrates a third implementation of the PFM control circuit in accordance with various embodiments of the present disclosure. Referring back to FIG. 2, when the power converter is configured to operate in the PFM mode, S2 and S3 shown in FIG. 2 are turned off, and S1 is turned on. The circuit shown in FIG. 2 can be simplified as the circuit shown in FIG. 12. In the third implementation of the PFM control circuit, a constant on-time generator 715 is added into the PFM control circuit. As shown in FIG. 12, the constant on-time generator 715 is configured to receive the input voltage VIN and the sensed output voltage VOUT_S. As shown in FIG. 12, the function units in the dashed rectangle 710 are the PFM control circuit of the power converter 700.

In some embodiments, a resistor-capacitor low pass filter is needed to obtain the sensed the output voltage from the SW node since the PFM control circuit does not have any access to the actual output voltage. The output voltage is determined once the output feedback divider is determined and the reference voltage of the voltage error amplifier, REF, is known. Therefore, the output voltage sense can be done each time during the soft start period to detect the output voltage through the SW switching node. There is no need to continue sense the output voltage during the operation.

As shown in FIG. 12, the power converter 700 comprises a buck power stage, an output feedback divider, and the PFM control circuit. The buck power stage comprises an input filtering capacitor 701, power switches 702, 703, an output inductor 704 and an output filter capacitor 705. The output feedback divider comprises resistors 706, 707, and a feedforward capacitor 708. The PFM control circuit comprises control logic and gate drive circuits 711, a current zero crossing detection comparator 712, a comparator 713, a constant on-time generator 715 and an error amplifier 714.

In some embodiments, the error amplifier 714 is a transconductance operation amplifier having a dominant pole such as the error amplifier shown in FIG. 6. Referring back to FIG. 6, the capacitor 401 and the resistor 402 are connected in parallel between the output of the error amplifier and ground. The capacitor 401 and the resistor 402 form the dominant pole.

In operation, an output of the constant on-time generator 715 is used to determine an on-time of the high-side switch 702 of the power converter 700. A comparison of the voltage on the feedback node and the output voltage of the error amplifier is used to determine a turn-on instant of the high-side switch 702 of the power converter 700. The current zero crossing detection comparator 712 is configured to determine an on-time of the low-side switch 703 of the power converter 700 once a current flowing through the low-side switch of the power converter reaches zero.

Figure 13:
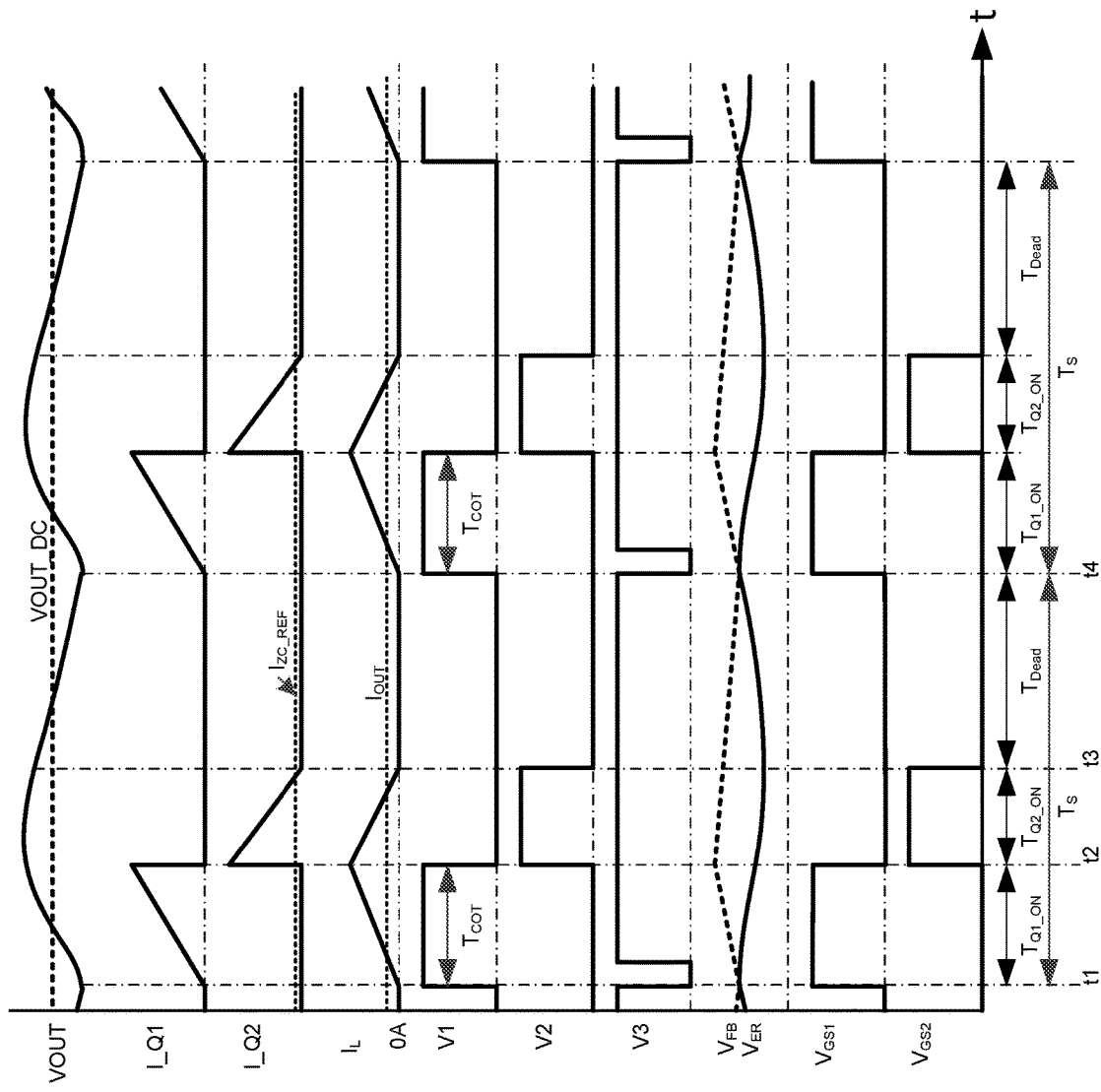
FIG. 13 illustrates various voltage and current signals associated with the third implementation of the PFM control circuit shown in FIG. 12 in accordance with various embodiments of the present disclosure.

FIG. 13 illustrates various voltage and current signals associated with the third implementation of the PFM control circuit shown in FIG. 12 in accordance with various embodiments of the present disclosure. The horizontal axis represents intervals of time. There are ten rows. The first row represents the output voltage of the power converter shown in FIG. 12. The second row represents the current I_Q1 flowing through the high-side switch of the power converter. The third row represents the current I_Q2 flowing through the low-side switch of the power converter. The fourth row represents the current $I_L$ flowing through the inductor of the power converter. The fifth row represents the signal V1 shown in FIG. 12. The sixth row represents the signal V2 shown in FIG. 12. The seventh row represents the signal V3 shown in FIG. 12. The eighth row represents the output voltage $V_{ER}$ of the error amplifier and the voltage $V_{FB}$ on the feedback node. The solid line is $V_{ER}$, and the dashed line is $V_{FB}$. The ninth row represents the gate drive signal $V_{GS1}$ of the high-side switch of the power converter. The tenth row represents the gate drive signal $V_{GS2}$ of the low-side switch of the power converter.

In operation, during the time interval (from t1 to t2) in which the high-side switch 702 is on, the inductor current $I_L$ is charged from zero, and the output ripple voltage increases. In response to the increased output ripple voltage, the voltage on the feedback node FB increases too. Since the voltage on the feedback node FB is fed into the inverting input of the error amplifier (shown in FIG. 6), the output voltage of the voltage error amplifier decreases. Once the constant on-time interval expires, the constant on-time generator 715 pulls the control logic signal V1 low (from a logic high state to a logic low state at t2). In response to this short low pulse, the control logic and gate drive circuits 711 turn off the high-side switch 702 and turn on the low-side switch 703 at t2 as shown in FIG. 13.

Once the low-side switch 703 is turned on, the current zero crossing detection comparator 712 is enabled to monitor the current (I_Q703) flowing through the low-side switch 703, and the logic signal V2 changes from a logic low state to a logic high state at t2. Once the current flowing through the low-side switch 703 reaches zero, the logic signal V2 changes from a logic high state to a logic low state at t3. This logic state change of V2 causes the control logic and gate drive circuits 711 to turn off the low-side switch 703 at t3, and keep the high-side switch 702 off as shown in FIG. 13.

During the time interval from t3 to t4, both switches 702 and 703 are off. The output voltage of the power converter decreases since the output load current is maintained by discharging the output capacitor 705.

At t4, the voltage ($V_{FB}$) at the inverting input of the comparator 713 reaches the output voltage of the voltage error amplifier. The comparator 713 triggers accordingly. The comparator 713 generates a short low pulse at the control logic signal V3. The short low pulse at the control logic signal V3 enables the constant on-time generator 715. The control logic signal V1 changes from low to high. The logic state change of V1 causes the control logic and gate drive circuits 711 to turn on the high-side switch 702, and keep the low-side switch 703 off. The inductor current starts to charge up from zero. Once the constant on-time expires, the control logic signal V1 is pulled low and causes the control logic and gate drive circuits 711 to turn off the power switch 702 and turn on the power switch 703. The control logic signal V2 resets from a logic low state to a logic high state, and the zero current crossing detection comparator 712 is enabled. The PFM mode switching cycle repeats as shown in FIG. 13.

It should be noted that the amount of energy delivered to the output can be controlled by adjusting the constant on-time interval.

The transient response of the power converter 700 is very similar to that of the power converter 500, and hence is not repeated herein.

Figure 14:
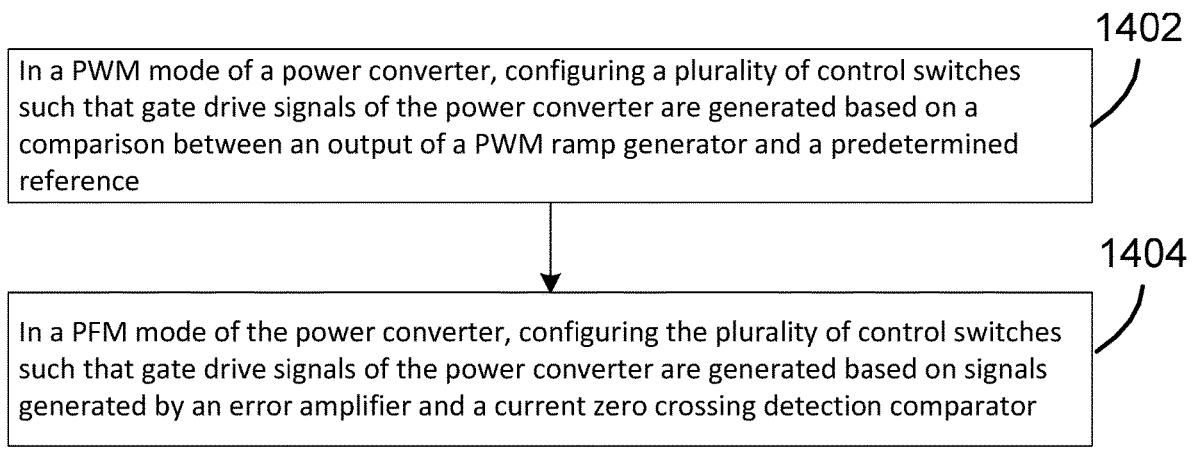
FIG. 14 illustrates a flow chart of a control method for operating the power converter shown in FIG. 2 in accordance with various embodiments of the present disclosure.

FIG. 14 illustrates a flow chart of a control method for operating the power converter shown in FIG. 2 in accordance with various embodiments of the present disclosure. This flowchart shown in FIG. 14 is merely an example, which should not unduly limit the scope of the claims. One of ordinary skill in the art would recognize many variations, alternatives, and modifications. For example, various steps illustrated in FIG. 14 may be added, removed, replaced, rearranged and repeated.

At step 1402, in a PWM mode of a power converter, a plurality of control switches is configured such that gate drive signals of the power converter are generated based on a comparison between an output of a PWM ramp generator and a predetermined reference.

At step 1404, in a PFM mode of the power converter, the plurality of control switches is configured such that gate drive signals of the power converter are generated based on signals generated by an error amplifier and a current zero crossing detection comparator.

In some embodiments, a high-side switch and a low-side switch are connected in series between an input voltage bus and ground, wherein a common node of the high-side switch and the low-side switch is a switching node of the power converter.

In some embodiments, an inductor is connected between the common node of the high-side switch and the low-side switch and an output of the power converter.

In some embodiments, a PWM ramp generator is coupled between the switching node of the power converter and a first input of a comparator, and wherein the PWM ramp generator comprises a first resistor and a first capacitor connected in series between the switching node and the first input of the comparator, and a second resistor and a second capacitor connected in parallel between the first input of the comparator and a feedback node.

In some embodiments, the comparator has an output coupled to control logic and gate drive circuits.

In some embodiments, the error amplifier is coupled between a second input of the comparator and a reference node.

In some embodiments, a current zero crossing detection comparator is coupled to the control logic and gate drive circuits.

In some embodiments, a first control switch of the plurality of control switches is connected between the first input of the comparator and the feedback node. A second control switch of the plurality of control switches is connected between the second input of the comparator and the reference node. A third control switch of the plurality of control switches is coupled between the switching node and the first input of the comparator.

The method further comprises in the PWM mode of the power converter, configuring the second switch and the third switch to be turned on, and configuring the first switch to be turned off.

The method further comprises in the PFM mode of the power converter, configuring the second switch and the third switch to be turned off, and configuring the first switch to be turned on.

The method further comprises in the PFM mode of the power converter, comparing a voltage on the feedback node with a sum of an output voltage of the error amplifier and a threshold voltage from a threshold generator to determine an on-time of the high-side switch of the power converter, comparing the voltage on the feedback node and the output voltage of the error amplifier to determine a turn-on instant of the high-side switch of the power converter, and determining, by the current zero crossing detection comparator, an on-time of the low-side switch of the power converter once a current flowing through the low-side switch of the power converter reaches zero.

The method further comprises in the PFM mode of the power converter, comparing a current flowing through the high-side switch of the power converter with a predetermined peak current reference to determine an on-time of the high-side switch of the power converter, comparing a voltage on the feedback node with an output voltage of the error amplifier to determine a turn-on instant of the high-side switch of the power converter, and determining, by the current zero crossing detection comparator, an on-time of the low-side switch of the power converter once a current flowing through the low-side switch of the power converter reaches zero.

The method further comprises in the PFM mode of the power converter, determining an on-time of the high-side switch of the power converter based on an output of a constant on-time generator, comparing a voltage on the feedback node with an output voltage of the error amplifier to determine a turn-on instant of the high-side switch of the power converter, and determining, by the current zero crossing detection comparator, an on-time of the low-side switch of the power converter once a current flowing through the low-side switch of the power converter reaches zero.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
   a PWM ramp generator coupled between a switching node of a power converter and a first input of a comparator, the PWM ramp generator comprising a first resistor and a first capacitor coupled in series between the switching node and the first input of the comparator, and a second resistor and a second capacitor connected in parallel between the first input of the comparator and a feedback node;
   a PFM control circuit comprising an error amplifier and a current zero crossing detection comparator, wherein the error amplifier is coupled between a second input of the comparator and a reference node, and the PFM control circuit is configured to generate gate drive signal for controlling the power converter when the power converter is operating in a PFM mode;
   a first control switch connected between the first input of the comparator and the feedback node;
   a second control switch connected between the second input of the comparator and the reference node; and
   a third control switch coupled between the switching node and the first input of the comparator, wherein:
   the second control switch and the third control switch are configured to be turned on, and the first control switch is configured to be turned off when the power converter is operating in a PWM mode; and
   the second control switch and the third control switch are configured to be turned off, and the first control switch is configured to be turned on when the power converter is operating in the PFM mode.

2. The apparatus of claim 1, wherein the power converter comprises:
   a high-side switch and a low-side switch connected in series between an input voltage bus and ground, wherein a common node of the high-side switch and the low-side switch is the switching node of the power converter; and
   an inductor connected between the common node of the high-side switch and the low-side switch and an output of the power converter.

3. The apparatus of claim 1, further comprising:
   a divider comprising a third resistor and a fourth resistor connected in series between an output of the power converter and ground; and
   a third capacitor connected in parallel with the third resistor, wherein a common node of the third resistor and the fourth resistor is the feedback node.

4. The apparatus of claim 1, further comprising:
   a threshold voltage generator coupled between the second input of the comparator and an output of the error amplifier, wherein:
   the error amplifier is a transconductance operation amplifier;

a fourth capacitor and a fifth resistor are connected in parallel between the output of the error amplifier and ground, and wherein the fourth capacitor and the fifth resistor form a pole;

a non-inverting input of the error amplifier is connected to a predetermined reference;

an inverting input of the error amplifier is connected to the feedback node, and wherein:

a comparison of a voltage on the feedback node, and a sum of an output voltage of the error amplifier and a threshold voltage from the threshold voltage generator is used to determine an on-time of a high-side switch of the power converter, and a comparison of the voltage on the feedback node and the output voltage of the error amplifier is used to determine a turn-on instant of the high-side switch of the power converter; and the current zero crossing detection comparator is configured to determine an on-time of a low-side switch of the power converter once a current flowing through the low-side switch of the power converter reaches zero.

5. The apparatus of claim 1, further comprising:

a peak current detection comparator, wherein:

the error amplifier is a transconductance operation amplifier;

a fourth capacitor and a fifth resistor are connected in parallel between an output of the error amplifier and ground, and wherein the fourth capacitor and the fifth resistor form a pole;

a non-inverting input of the error amplifier is connected to a predetermined reference;

an inverting input of the error amplifier is connected to the feedback node, and wherein:

a comparison of a current flowing through a high-side switch of the power converter and a predetermined peak current reference is used to determine an on-time of the high-side switch of the power converter; and a comparison of a voltage on the feedback node and an output voltage of the error amplifier is used to determine a turn-on instant of the high-side switch of the power converter; and the current zero crossing detection comparator is configured to determine an on-time of a low-side switch of the power converter once a current flowing through the low-side switch of the power converter reaches zero.

6. The apparatus of claim 1, further comprising:

a constant on-time generator, wherein:

the error amplifier is a transconductance operation amplifier;

a fourth capacitor and a fifth resistor are connected in parallel between an output of the error amplifier and ground, and wherein the fourth capacitor and the fifth resistor form a pole;

a non-inverting input of the error amplifier is connected to a predetermined reference;

an inverting input of the error amplifier is connected to the feedback node, and wherein:

an output of the constant on-time generator is used to determine an on-time of a high-side switch of the power converter; and a comparison of a voltage on the feedback node and an output voltage of the error amplifier is used to determine a turn-on instant of the high-side switch of the power converter; and the current zero crossing detection comparator is configured to determine an on-time of a low-side switch of the power converter once a current flowing through the low-side switch of the power converter reaches zero.

7. The apparatus of claim 6, further comprising:

a resistor-capacitor filter connected to the switching node, wherein the resistor-capacitor filter is configured such that an output voltage of the resistor-capacitor filter is used to determine an output voltage of the power converter fed into the constant on-time generator when the power converter is operating in the PFM mode.

8. The apparatus of claim 1, wherein:

the comparator is a hysteresis comparator;

the first input of the comparator is an inverting input; and the second input of the comparator is a non-inverting input.

9. The apparatus of claim 1, wherein:

a resistance value of the first resistor is at least ten times greater than a resistance value of the second resistor;

the second resistor is configured to provide a leakage path for the first input of the comparator; and the first capacitor is configured such that a majority of a DC voltage difference between an output of the power converter and the feedback node is across the first capacitor.

10. A method comprising:

in a PWM mode of a power converter, configuring a plurality of control switches such that gate drive signals of the power converter are generated based on a comparison between an output of a PWM ramp generator and a predetermined reference, wherein the PWM ramp generator comprises a first resistor and a first capacitor coupled in series between a switching node of the power convert and a first input of a comparator, and a second resistor and a second capacitor connected in parallel between the first input of the comparator and a feedback node; and in a PFM mode of the power converter, configuring the plurality of control switches such that the gate drive signals of the power converter are generated based on signals generated by an error amplifier and a current zero crossing detection comparator, wherein the error amplifier is coupled between a second input of the comparator and a reference node, and the plurality of control switches comprises a first control switch, a second control switch and a third control switch, and wherein:

the first control switch is connected between the first input of the comparator and the feedback node;

the second control switch is connected between the second input of the comparator and the reference node; and the third control switch is coupled between the switching node and the first input of the comparator, and wherein:

the second control switch and the third control switch are configured to be turned on, and the first control switch is configured to be turned off when the power converter is operating in the PWM mode; and the second control switch and the third control switch are configured to be turned off, and the first control switch is configured to be turned on when the power converter is operating in the PFM mode.

11. The method of claim 10, wherein:
a high-side switch and a low-side switch are connected in series between an input voltage bus and ground, wherein a common node of the high-side switch and the low-side switch is the switching node of the power converter;
an inductor is connected between the common node of the high-side switch and the low-side switch and an output of the power converter;
the comparator has an output coupled to control logic and gate drive circuits; and
the current zero crossing detection comparator is coupled to the control logic and gate drive circuits.

12. The method of claim 11, further comprising:
in the PFM mode of the power converter, comparing a voltage on the feedback node with a sum of an output voltage of the error amplifier and a threshold voltage from a threshold generator to determine an on-time of the high-side switch of the power converter;
comparing the voltage on the feedback node and the output voltage of the error amplifier to determine a turn-on instant of the high-side switch of the power converter; and
determining, by the current zero crossing detection comparator, an on-time of the low-side switch of the power converter once a current flowing through the low-side switch of the power converter reaches zero.

13. The method of claim 11, further comprising:
in the PFM mode of the power converter, comparing a current flowing through the high-side switch of the power converter with a predetermined peak current reference to determine an on-time of the high-side switch of the power converter;
comparing a voltage on the feedback node with an output voltage of the error amplifier to determine a turn-on instant of the high-side switch of the power converter; and
determining, by the current zero crossing detection comparator, an on-time of the low-side switch of the power converter once a current flowing through the low-side switch of the power converter reaches zero.

14. The method of claim 11, further comprising:
in the PFM mode of the power converter, determining an on-time of the high-side switch of the power converter based on an output of a constant on-time generator;
comparing a voltage on the feedback node with an output voltage of the error amplifier to determine a turn-on instant of the high-side switch of the power converter; and
determining, by the current zero crossing detection comparator, an on-time of the low-side switch of the power converter once a current flowing through the low-side switch of the power converter reaches zero.

15. A system comprising:
a high-side switch and a low-side switch connected in series between an input voltage bus and ground, wherein a common node of the high-side switch and the low-side switch is a switching node;
an inductor connected between the common node of the high-side switch and the low-side switch and an output of the system;
a PWM ramp generator coupled between the switching node and a first input of a comparator, the PWM ramp generator comprising a first resistor and a first capacitor coupled in series between the switching node and the first input of the comparator, and a second resistor and a second capacitor connected in parallel between the first input of the comparator and a feedback node;
a PFM control circuit comprising an error amplifier and a current zero crossing detection comparator, wherein the error amplifier is coupled between a second input of the comparator and a reference node, and the PFM control circuit is configured to generate gate drive signal for controlling the system when the system is operating in a PFM mode;
a first control switch connected between the first input of the comparator and the feedback node;
a second control switch connected between the second input of the comparator and the reference node; and
a third control switch coupled between the switching node and the first input of the comparator, wherein:
the second control switch and the third control switch are configured to be turned on, and the first control switch is configured to be turned off when the system is operating in a PWM mode; and
the second control switch and the third control switch are configured to be turned off, and the first control switch is configured to be turned on when the system is operating in the PFM mode.

16. The system of claim 15, further comprising:
a divider comprising a third resistor and a fourth resistor connected in series between the output of the system and the ground;
a third capacitor connected in parallel with the third resistor, wherein a common node of the third resistor and the fourth resistor is the feedback node; and
a resistor-capacitor filter connected to the switching node, wherein the resistor-capacitor filter is configured such that an output voltage of the resistor-capacitor filter is used to determine an output voltage of the system when the system is operating in the PFM mode.

* * * * *